US011719967B2

(12) United States Patent
Matsushima

(10) Patent No.: US 11,719,967 B2
(45) Date of Patent: Aug. 8, 2023

(54) DISPLAY SYSTEM AND VEHICLE

(71) Applicant: Japan Display Inc., Tokyo (JP)

(72) Inventor: Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/991,848

(22) Filed: Nov. 22, 2022

(65) Prior Publication Data

US 2023/0079179 A1 Mar. 16, 2023

Related U.S. Application Data

(63) Continuation of application No. 17/241,084, filed on Apr. 27, 2021, now Pat. No. 11,536,992.

(30) Foreign Application Priority Data

Apr. 28, 2020 (JP) .................. 2020-079641

(51) Int. Cl.
*G02F 1/13* (2006.01)
*G02F 1/133* (2006.01)
*G02F 1/1335* (2006.01)
*B60K 35/00* (2006.01)

(52) U.S. Cl.
CPC ........ *G02F 1/1323* (2013.01); *G02F 1/13318* (2013.01); *G02F 1/133528* (2013.01); *B60K 35/00* (2013.01); *B60K 2370/52* (2019.05); *B60K 2370/744* (2019.05)

(58) Field of Classification Search
CPC .................................... G02F 1/1323
See application file for complete search history.

(56) References Cited

U.S. PATENT DOCUMENTS

| 2014/0191933 | A1* | 7/2014 | Fan | .................. G02F 1/133 345/89 |
| 2018/0113334 | A1* | 4/2018 | Fang | .................. G02F 1/133528 |
| 2020/0254876 | A1* | 8/2020 | Cordell | .................. G06V 20/56 |
| 2020/0371386 | A1* | 11/2020 | Liou | ..................... G02F 1/1323 |

FOREIGN PATENT DOCUMENTS

| JP | 2004-133334 A | 4/2004 |
| JP | 2006-195388 A | 7/2006 |

* cited by examiner

*Primary Examiner* — Edmond C Lau
(74) *Attorney, Agent, or Firm* — Xsensus LLP

(57) ABSTRACT

According to one embodiment, a display system includes an external light sensor, a display panel, a viewing angle control panel including a liquid crystal layer containing liquid crystal molecules twist-aligned, configured such that a drive voltage applied to the liquid crystal layer is controlled based on an external light intensity detected by the external light sensor, and a polarization axis rotation element disposed between the viewing angle control panel and the display panel. The drive voltage when the external light intensity is less than a threshold value is greater than the drive voltage when the external light intensity is greater or equal to than the threshold value.

10 Claims, 16 Drawing Sheets

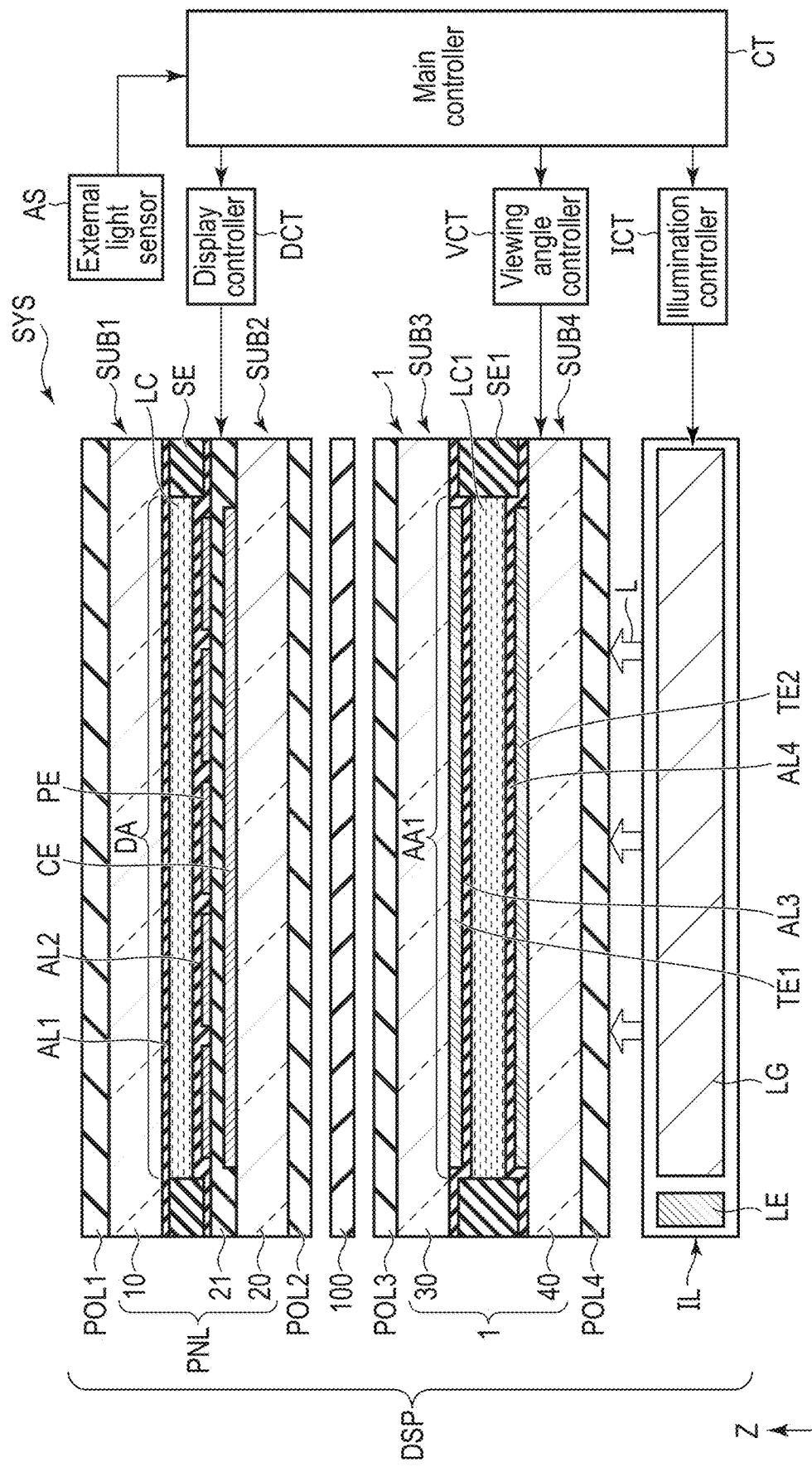
F I G. 2

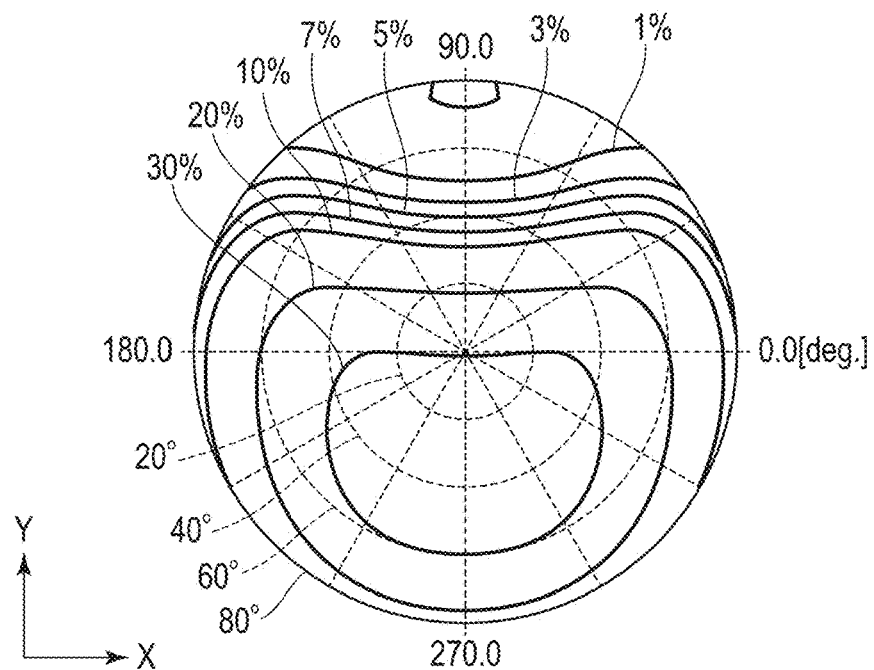
F I G. 7
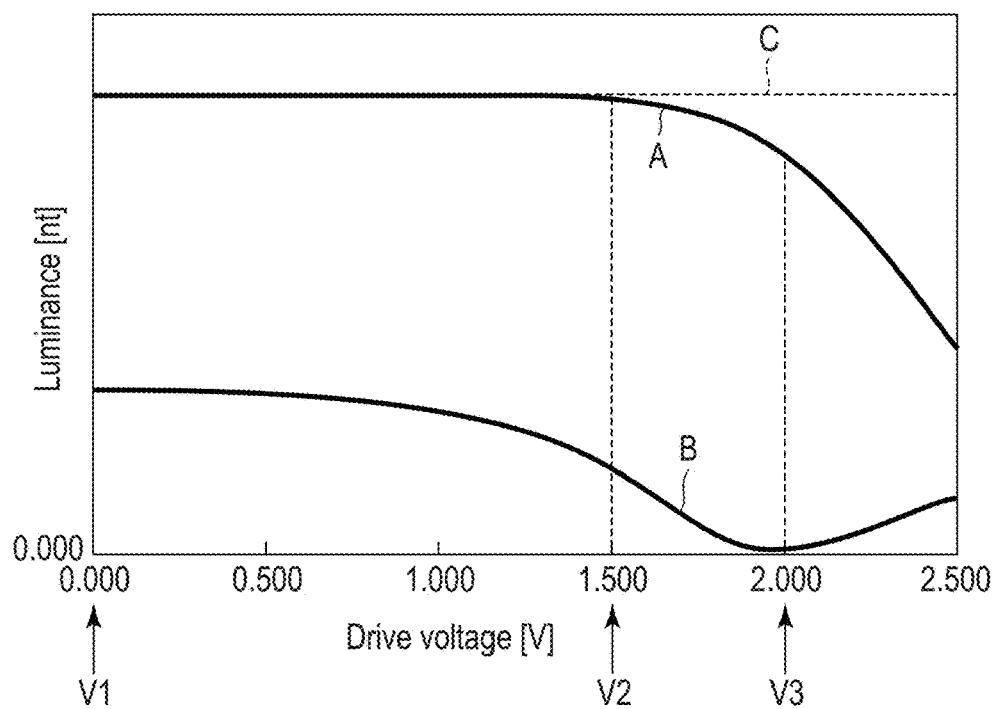
F I G. 8

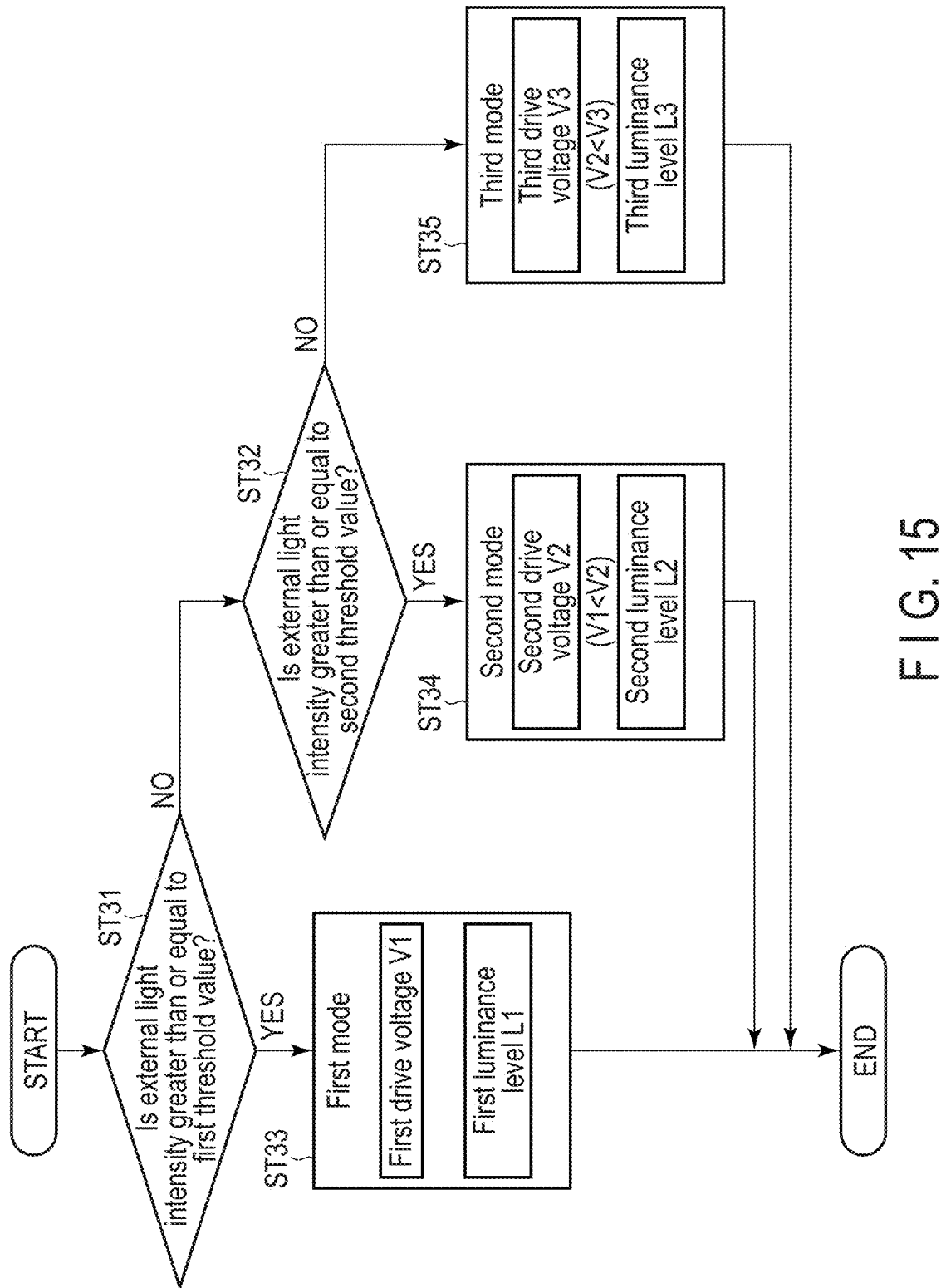
F I G. 15

DISPLAY SYSTEM AND VEHICLE

CROSS-REFERENCE TO RELATED APPLICATIONS

This application is a continuation of U.S. patent application Ser. No. 17/241,084, filed Apr. 27, 2021, which is based upon and claims the benefit of priority from Japanese Patent Application No. 2020-079641, filed Apr. 28, 2020, the entire contents of each are incorporated herein by reference.

FIELD

Embodiments described herein relate generally to a display system and a vehicle

BACKGROUND

In a recent display device, there is demand for making a viewing angle which realizes a predetermined contrast ratio changeable. For example, in a display device mounted on a vehicle such as a car, there is demand for controlling the viewing angle such that a display image can be viewed from a passenger seat side but cannot be viewed from a driver seat side during driving or the like.

In the application of the viewing angle control, some technologies using a twisted nematic liquid crystal are proposed.

BRIEF DESCRIPTION OF THE DRAWINGS

FIG. 2 is an illustration showing a configuration example of a display system SYS employing the display device DSP shown in FIG. 1.

FIG. 7 is an illustration showing a simulation result of a viewing angle characteristic in the third mode.

FIG. 8 is an illustration showing the relationship between a drive voltage and a luminance in the viewing angle control panel 1.

FIG. 15 is an illustration for explaining the third control example of the display system SYS.

DETAILED DESCRIPTION

Figure 1:
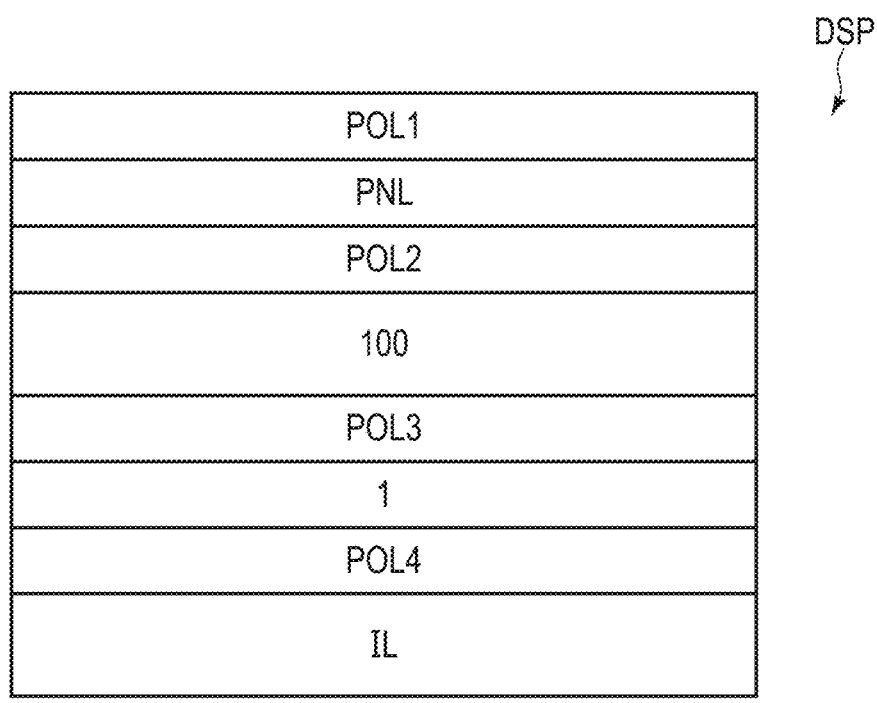
FIG. 1 is an illustration showing a configuration example of a display device DSP.

In general, according to one embodiment, there is provided a display system comprising: an external light sensor detecting an external light intensity; a display panel modulating a first polarization component having a first polarization axis; a viewing angle control panel comprising a liquid crystal layer containing liquid crystal molecules twist-aligned, configured such that a drive voltage applied to the liquid crystal layer is controlled based on the external light intensity detected by the external light sensor, and transmitting a second polarization component having a second polarization axis different form the first polarization axis; and a polarization axis rotation element disposed between the viewing angle control panel and the display panel, and rotating the second polarization axis of the second polarization component transmitted through the viewing angle control panel. The drive voltage when the external light intensity is less than a threshold value is greater than the drive voltage when the external light intensity is greater than or equal to the threshold value.

According to another embodiment, there is provided a display system comprising: a display panel modulating a first polarization component having a first polarization axis; a tracking sensor tracking an eye gaze of a user opposed to the display panel; a viewing angle control panel comprising a liquid crystal layer containing liquid crystal molecules twist-aligned, configured such that a drive voltage applied to the liquid crystal layer is controlled based on the eye gaze detected by the tracking sensor, and transmitting a second polarization component having a second polarization axis different form the first polarization axis; and a polarization axis rotation element disposed between the viewing angle control panel and the display panel, and rotating the second polarization axis of the second polarization component transmitted through the viewing angle control panel. The drive voltage when the eye gaze is detected to be in a predetermined direction is greater than the drive voltage when the eye gaze is detected to be in a direction different from the predetermined direction.

According to yet another embodiment, there is provided a vehicle comprising: a front window disposed in a front part of the vehicle; a driver seat and a passenger seat; a display device disposed in front of the driver seat and the passenger seat; and an external light sensor detecting an external light intensity. The display device comprises: a display panel; and a viewing angle control panel comprising a liquid crystal layer containing liquid crystal molecules twist-aligned, and configured such that a drive voltage applied to the liquid crystal layer is controlled based on the external light intensity detected by the external light sensor. The drive voltage when the external light intensity is less than a threshold value is greater than the drive voltage when the external light intensity is greater than or equal to the threshold value.

According to yet another embodiment, there is provided a vehicle comprising: a side mirror disposed in a side part of the vehicle; a driver seat and a passenger seat; a display device disposed in front of the driver seat and the passenger seat; a side window disposed between the driver seat and the side mirror; and a tracking sensor tracking an eye gaze of a user on the driver seat. The display device comprises: a display panel; and a viewing angle control panel comprising a liquid crystal layer containing liquid crystal molecules twist-aligned, and configured such that a drive voltage applied to the liquid crystal layer is controlled based on the eye gaze detected by the tracking sensor. The drive voltage when the eye gaze is detected to be in a predetermined direction is greater than the drive voltage when the eye gaze is detected to be in a direction different from the predetermined direction.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and the detailed descriptions thereof that are considered redundant are omitted unless necessary.

First Embodiment

FIG. 1 is an illustration showing a configuration example of a display device DSP.

The display device DSP comprises an illumination device IL, a viewing angle control panel 1, a polarization axis rotation element 100, a display panel PNL, and first to fourth polarizers POL1 to POL4. The polarization axis rotation element 100 is disposed between the viewing angle control panel 1 and the display panel PNL. The viewing angle control panel 1 is disposed between the illumination device IL and the polarization axis rotation element 100.

The first polarizer POL1 is disposed on the front side of the display panel PNL (or an observation position side from which the display device DSP is observed). The second polarizer POL2 is disposed between the polarization axis rotation element 100 and the display panel PNL. The third polarizer POL3 is disposed between the viewing angle control panel 1 and the polarization axis rotation element 100. The fourth polarizer POL4 is disposed on the rear side of the viewing angle control panel 1 (or between the illumination device IL and the viewing angle control panel 1).

The viewing angle control panel 1 is, for example, a twisted nematic liquid crystal element, and the details of the viewing angle control panel 1 will be described later.

Accordingly, the display device DSP comprises at least one viewing angle control panel between the illumination device IL and the polarization axis rotation element 100. The display device DSP may comprise a plurality of viewing angle control panels of different viewing angle control directions.

FIG. 2 is an illustration showing a configuration example of a display system SYS employing the display device DSP shown in FIG. 1.

A display system SYS in the first embodiment comprises the display device DSP shown in FIG. 1, a main controller CT, an external light sensor AS, a display controller DCT, a viewing angle controller VCT, and an illumination controller ICT. The external light sensor AS is configured to detect an external light luminance around the display device DSP. The main controller CT controls each of the display controller DCT, the viewing angle controller VCT and the illumination controller ICT. In addition, the main controller CT can control the viewing angle controller VCT and the illumination controller ICT based on the external light intensity detected by the external light sensor AS. A specific control example will be described later.

A configuration example of the display device DSP will be described below. In the illustrated cross-sectional view of the display device DSP, a first direction X, a second direction Y, and a third direction Z are orthogonal to one another. However, they may cross one another at an angle other than 90°. The first direction X and the second direction Y correspond to, for example, directions parallel to a substrate included in the display device DSP, and the third direction Z corresponds to the thickness direction of the display device DSP.

The display panel PNL is, for example, a liquid crystal panel, and comprises a first substrate SUB1, a second substrate SUB2 and a liquid crystal layer LC. The liquid crystal layer LC is held between the first substrate SUB1 and the second substrate SUB2 and is sealed in by a sealant SE. For example, the display panel PNL described here is configured such that the alignment state of liquid crystal molecules contained in the liquid crystal layer LC is controlled by an electric field along the main surface of a substrate. Note that the display panel PNL of the present embodiment is not limited to the illustrated example but may be configured such that the alignment state of liquid crystal molecules is controlled by an electric field along the normal to the main surface of a substrate. The main surface of the substrate here corresponds to an X-Y plane defined by the first direction X and the second direction Y.

The first substrate SUB1 is located on the front side of the second substrate SUB2. The first substrate SUB1 comprises an insulating substrate 10 and an alignment film AL1. The second substrate SUB2 comprises an insulating substrate 20, an insulating film 21, a common electrode CE, a plurality of pixel electrodes PE and an alignment film AL2. The common electrode CE is disposed between the insulating substrate 20 and the insulating film 21. The pixel electrodes PE are disposed between the insulating film 21 and the alignment film AL2. In a display area DA in which an image is displayed, the pixel electrodes PE overlap one common electrode CE via the insulating film 21. The pixel electrode PE and the common electrode CE are controlled such that a predetermined drive voltage is applied to the liquid crystal layer LC. The alignment film AL1 and the alignment film AL2 are in contact with the liquid crystal layer LC.

Here, the illustration of the display panel PNL is simplified, and only the main part thereof is illustrated. However, the first substrate SUB1 further comprises a light-shielding layer, a color filter layer, an overcoat layer, a spacer and the like. In addition, the second substrate SUB2 comprises a plurality of scanning lines, a plurality of signal lines, switching elements electrically connected to the respective pixel electrodes PE, various insulating films and the like.

The display controller DCT controls a control signal supplied to the scanning lines, a video signal supplied to the signal lines, the potentials of the respective pixel electrodes PE, the potential of the common electrode CE and the like, and controls a drive voltage applied to the liquid crystal layer LC.

The viewing angle control panel 1 is, for example, a liquid crystal panel, and comprises a third substrate SUB3, a fourth substrate SUB4 and a liquid crystal layer LC1. The liquid crystal layer LC1 is held between the third substrate SUB3 and the fourth substrate SUB4 and is sealed in by a sealant SE1. The liquid crystal layer LC1 contains liquid crystal molecules twist-aligned as will be described later.

The third substrate SUB3 is located on the front side of the fourth substrate SUB4. The third substrate SUB3 comprises an insulating substrate 30, a first transparent electrode TE1 and an alignment film AL3. In an effective area AA1 for controlling a viewing angle, the first transparent electrode TE1 is formed over substantially the entire area and is disposed between the insulating substrate 30 and the alignment film AL3. The fourth substrate SUB4 comprises an insulating substrate 40, a second transparent electrode TE2 and an alignment film AL4. In the effective area AA1, the second transparent electrode TE2 is formed over substantially the entire area and is disposed between the insulating substrate 40 and the alignment film AL4. The alignment film AL3 and the alignment film AL4 are in contact with the liquid crystal layer LC1. The liquid crystal layer LC1 has an optical rotary power which rotates the polarization axis of a polarization component which is linearly polarized light as will be described later.

The first transparent electrode TE1 overlaps the second transparent electrode TE2 via the liquid crystal layer LC1. The first transparent electrode TE1 and the second transparent electrode TE2 are controlled such that a predetermined drive voltage is applied to the liquid crystal layer LC1. The first transparent electrode TE1 and the second transparent electrode TE2 each are, for example, a single sheet-shaped electrode, but each may be divided into a plurality of electrodes along at least one of the first direction X and the second direction Y.

The viewing angle controller VCT controls the potential of the first transparent electrode TE1, the potential of the second transparent electrode TE2 and the like, and controls a drive voltage applied to the liquid crystal layer LC1. In the configuration example shown in FIG. 2, the viewing angle controller VCT is controlled by the main controller CT, and is configured to control the drive voltage based on the external light intensity detected by the external light sensor AS.

The illumination device IL incorporates a light-emitting element LE, a light guide LG and the like, and emits illumination light L toward the display panel PNL. The illumination controller ICT controls the luminance level of the light-emitting element LE. In the configuration example shown in FIG. 2, the illumination controller ICT is controlled by the main controller CT, and may be configured to control the luminance level of the light-emitting element LE based on the external light intensity detected by the external light sensor AS.

When attention is focused on the relationship between the display panel PNL and the viewing angle control panel 1, the liquid crystal layer LC and the liquid crystal layer LC1 overlap each other in the third direction Z. The display area DA and the effective area AA1 overlap each other in the third direction Z. The common electrode CE, the pixel electrodes PE, the first transparent electrode TE1 and the second transparent electrode TE2 overlap one another in the third direction Z.

The insulating substrates 10, 20, 30 and 40 each are, for example, a transparent substrate such as a glass substrate or a resin substrate. For example, the insulating substrates 10 and 20 may be glass substrates, and the insulating substrates 30 and 40 may be resin substrates. In addition, the insulating substrates 10 and 40 may be glass substrates, and the insulating substrates 20 and 30 may be resin substrates.

The common electrode CE, the pixel electrodes PE, the first transparent electrode TE1 and the second transparent electrode TE2 each are a transparent electrode formed of a transparent conductive material such as indium tin oxide (ITO) or indium zinc oxide (IZO). The alignment films AL1 to AL4 each are a horizontal alignment film having an alignment regulating force substantially parallel to the X-Y plane.

The first polarizer POL1 is bonded to the insulating substrate 10, the second polarizer POL2 is bonded to the insulating substrate 20, the third polarizer POL3 is bonded to the insulating substrate 30, and the fourth polarizer POL4 is bonded to the insulating substrate 40. These polarizers POL1 to POL4 each are such that an adhesive is applied to one side of a preformed film, for example, but may be directly formed on the surface of the insulating substrate.

The polarization axis rotation element 100 may be bonded to at least one of the second polarizer POL2 and the third polarizer POL3 or may be integrally formed with the second polarizer POL2 or the third polarizer POL3.

In this display device DSP, the illumination light L emitted from the illumination device IL travels along the third direction Z, is transmitted through the viewing angle control panel 1 and the polarization axis rotation element 100 sequentially, and then illuminates the display panel PNL.

More specifically, when the illumination light L emitted from the illumination device IL is natural light, the fourth polarizer POL4 transmits the polarization component of a part of the illumination light L. The viewing angle control panel 1 rotates the polarization axis of the polarization component transmitted through the fourth polarizer POL4 in the liquid crystal layer LC1, and transmits the second polarization component. The second polarization component transmitted through the viewing angle control panel 1 is transmitted through the third polarizer POL3, and is then transmitted through the polarization axis rotation element 100.

The display panel PNL is illuminated with the first polarization component transmitted through the second polarizer POL2, and modulates the first polarization component in the liquid crystal layer LC.

The second polarization component transmitted through the viewing angle control panel 1 is different from the first polarization component modulated in the display panel PNL. For example, the first polarization component and the second polarization component each are linearly polarized light having a polarization axis in the X-Y plane. In the X-Y plane, the first polarization component has the first polarization axis in a direction of a predetermined angle with respect to the first direction X, and the second polarization component has the second polarization axis in a different direction from the first polarization axis with respect to the first direction X.

The polarization axis rotation element 100 rotates the polarization axis of light traveling from the viewing angle control panel 1 toward the display panel PNL. For example, the polarization axis rotation element 100 is an optical sheet (retarder) configured to impart a phase difference of ½ wavelength to linearly polarized light transmitted through itself. This polarization axis rotation element 100 may be a single optical sheet or a multilayer optical sheet. In addition, the polarization axis rotation element 100 only has to exhibit the function of rotating the polarization axis, and is not limited to an optical sheet but may be an element having an optical rotary power such as a twisted nematic liquid crystal element.

In this polarization axis rotation element 100, the second polarization axis of the second polarization component transmitted through the viewing angle control panel 1 and the third polarizer POL3 is rotated to be aligned with the first polarization axis. Therefore, the absorption in the second polarizer POL2 of the polarization component transmitted through the viewing angle control panel 1 and the third polarizer POL3 can be suppressed, and the decrease of the luminance of the illumination light reaching the display panel PNL can be suppressed.

Figure 3:
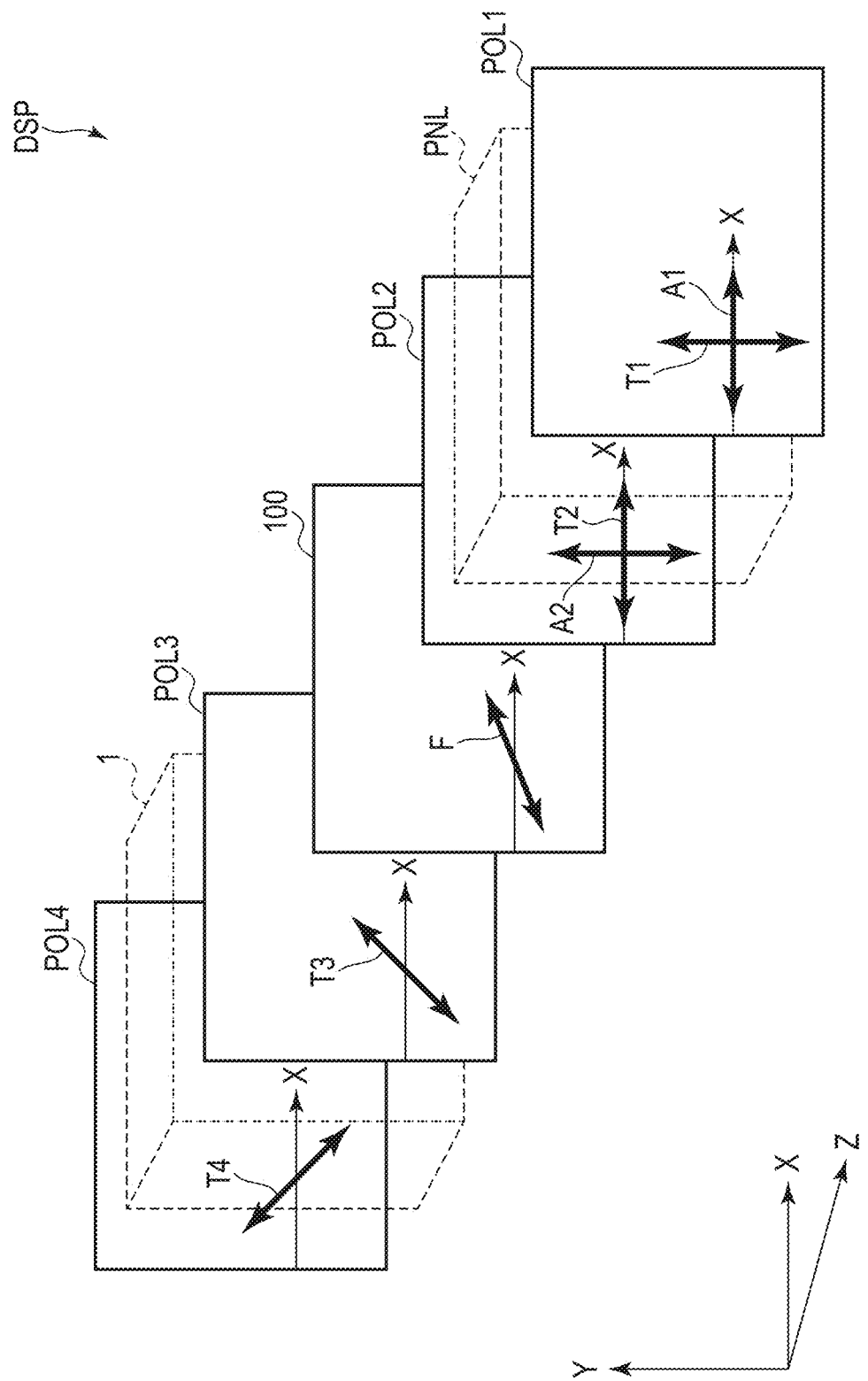
FIG. 3 is an illustration for explaining the axis angle of each optical element constituting the display device DSP.

FIG. 3 is an illustration for explaining the axis angle of each optical element constituting the display device DSP. Here, it is assumed that, in the X-Y plane, the direction of the front end of an arrow indicating the first direction X (X axis) is a reference direction, and an angle counterclockwise with respect to the reference direction is a positive angle.

The first polarizer POL1 has a first absorption axis A1 and a first transmission axis T1 which are substantially orthogonal to each other. The second polarizer POL2 has a second absorption axis A2 and a second transmission axis T2 which are substantially orthogonal to each other. The polarization axis rotation element 100 has a fast axis F. The third polarizer POL3 has a third transmission axis T3. The fourth polarizer POL4 has a fourth transmission axis T4.

Although not shown in the drawing, the slow axis of the polarization axis rotation element 100 is substantially orthogonal to the fast axis F in the X-Y plane. In addition, the absorption axis of the third polarizer POL3 is substantially orthogonal to the third transmission axis T3, and the absorption axis of the fourth polarizer POL4 is substantially orthogonal to the fourth transmission axis T4. In the specification, the fast axis F and the slow axis of the polarization axis rotation element 100 are collectively referred to as the optical axis of the polarization axis rotation element 100.

The first absorption axis A1 is substantially parallel to the first direction X, and is located in a direction of 0°. The first transmission axis T1 is located in a direction of 90°. The second absorption axis A2 is substantially orthogonal to the first absorption axis A1 and is located in the direction of 90°. The second transmission axis T2 is substantially orthogonal to the first transmission axis T1 and is located in the direction of 0°. The third transmission axis T3 is located in a direction of 45°. The fourth transmission axis T4 is substantially orthogonal to the third transmission axis T3 and is located in a direction of 135°. As described above, the second transmission axis T2 is located in a different direction from the third transmission axis T3.

Here, the direction of 0° corresponds to a 0°-180° direction in the X-Y plane, the direction of 90° corresponds to a 90°-270° direction in the X-Y plane, the direction of 45° corresponds to a 45°-225° direction in the X-Y plane, and the direction of 135° corresponds to a 135°-315° direction in the X-Y plane.

In this display device DSP, when light travels along the third direction Z, linearly polarized light transmitted through the fourth polarizer POL4 has a polarization axis along the fourth transmission axis T4, and linearly polarized light (the second polarization component) transmitted through the third polarization plate POL3 after the viewing angle control panel 1 has the second polarization axis along the third transmission axis T3. That is, the second polarization axis is located in the direction of 45° with respect to the X axis (or the 45°-225° direction). Linearly polarized light (the first polarization component) transmitted through the second polarizer POL2 has the first polarization axis along the second transmission axis T2. That is, the first polarization axis is located in the direction of 0° (or the 0°-180° direction or the X axis direction.

The optical axis of the polarization axis rotation element 100 (the fast axis F in FIG. 3) is located in a direction halfway between the direction of the first polarization axis and the direction of the second polarization axis in the X-Y plane. Alternatively, the optical axis of the polarization axis rotation element 100 is located in a direction halfway between the second transmission axis T2 and the third transmission axis T3. That is, in the illustrated example, the fast axis F is located in a direction of 22.5° (or a 22.5°-202.5° direction). The polarization axis rotation element 100 corresponds to a ½ waveplate as described above, and has a function of rotating the polarization axis $2*\theta°$ when the polarization axis of incident light is located in the direction of $\theta°$ with respect to the optical axis. Therefore, when the second polarization component transmitted through the third polarizer POL3 is transmitted through the polarization axis rotation element 100, the second polarization axis is rotated to be aligned with the first polarization axis. That is, the second polarization component is converted into the first polarization component in the polarization axis rotation element 100. The first polarization component transmitted through the polarization axis rotation element 100 illuminates the display panel PNL almost without being absorbed in the second polarizer POL2.

The first polarization component illuminating the display panel PNL is appropriately modulated in the liquid crystal layer LC, and is at least partly transmitted through the first polarizer POL1 to form a display image. The linearly polarized light transmitted through the first polarizer POL1 has a polarization axis along the first transmission axis T1. That is, the polarization axis of the linearly polarized light transmitted through the first polarizer POL1 is located in the direction of 90° (or the 90°-270° direction. Therefore, the display image can be viewed also when the display device DSP is observed via polarized sunglasses.

Figure 4:
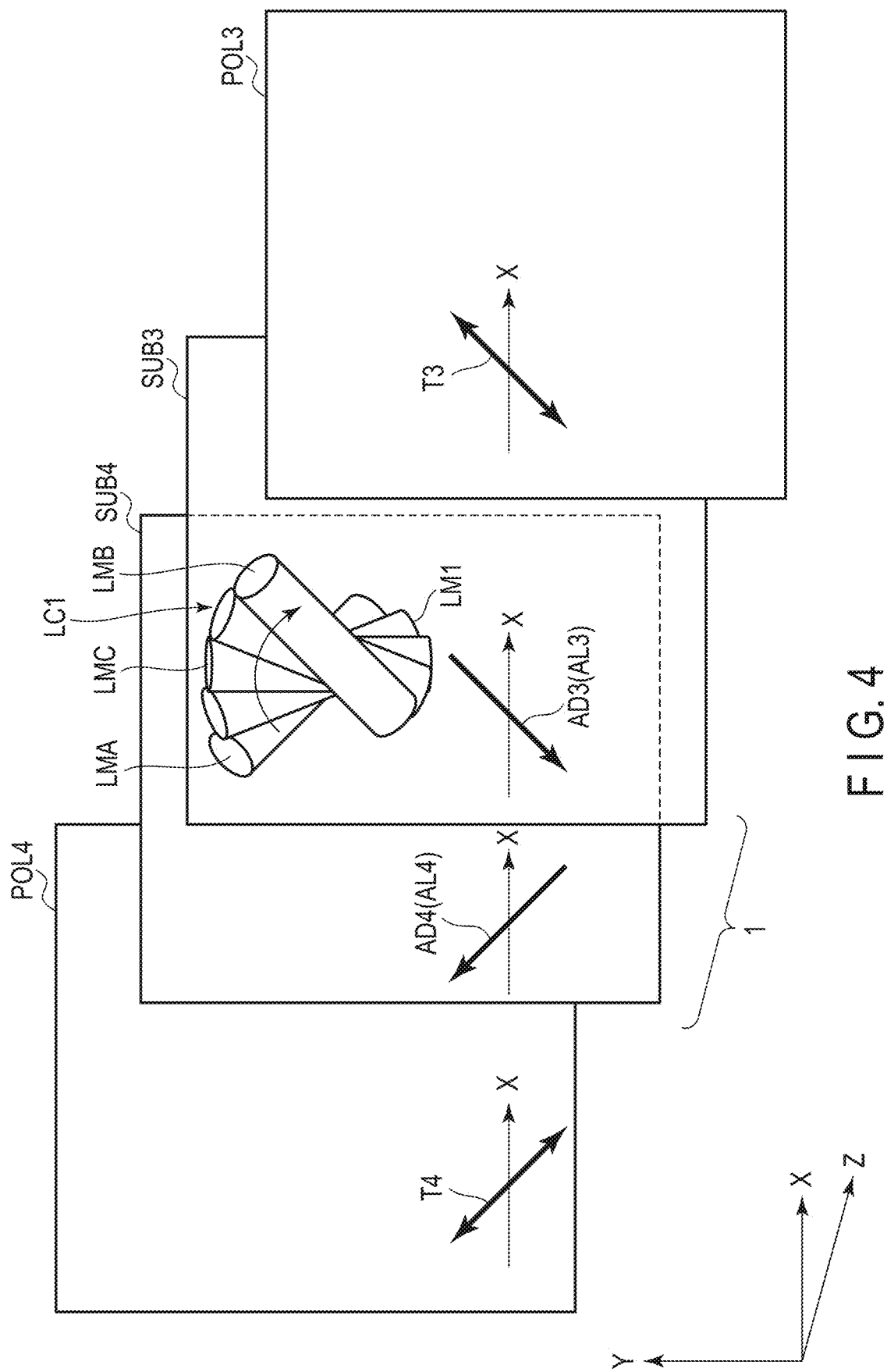
FIG. 4 is an illustration for explaining a configuration example of a viewing angle control panel 1.

FIG. 4 is an illustration for explaining a configuration example of the viewing angle control panel 1. The initial alignment state of liquid crystal molecules LM1 during an off time when no voltage is applied to the liquid crystal layer LC1 between the alignment film AL3 and the alignment film AL4 is illustrated here.

An alignment treatment direction AD4 of the alignment film AL4 is substantially orthogonal to an alignment treatment direction AD3 of the alignment film AL3. Note that the alignment treatment may be rubbing treatment or photoalignment treatment. However, it is preferable, from the perspective of uniformly and smoothly driving the liquid crystal molecules LM1 during an on time when a voltage is applied to the liquid crystal layer LC1, that a liquid crystal molecule LMA close to the alignment film AL4 and a liquid crystal molecule LMB close to the alignment film AL3 each should have a relatively large pretilt angle, and it is preferable, in order to realize this, that the alignment treatment should be rubbing treatment. In addition, as long as the liquid crystal molecules LMA and LMB during the off time are controlled to have a relatively large pretilt angle, photoalignment treatment can be applied.

In the configuration example shown in FIG. 4, the alignment treatment direction AD4 is substantially parallel to the fourth transmission axis T4, and the alignment treatment direction AD3 is substantially parallel to the third transmission axis T3. That is, the front end of an arrow indicating the alignment treatment direction AD4 is located in the direction of 135°, and the front end of an arrow indicating the alignment treatment direction AD3 is located in the direction of 225°. In the liquid crystal layer LC1, the liquid crystal molecules LM1 arranged along the third direction Z are twist-aligned. A chiral agent is added to the liquid crystal layer LC1, and the liquid crystal molecules LM1 are configured to be twist-aligned clockwise from the fourth polarizer POL4 (or the fourth substrate SUB4) toward the third polarizer POL3 (or the third substrate SUB3).

The liquid crystal molecule LMA close to the fourth polarizer POL4 and the fourth substrate SUB4 is aligned such that the major axis thereof extends along the alignment treatment direction AD4. Alternatively, the liquid crystal molecule LMA is aligned in a direction along the fourth transmission axis T4. That is, the liquid crystal molecule LMA is aligned in the direction of 135°. In addition, the liquid crystal molecule LMA is inclined (pretilted) such that the end portion thereof close to the front end of the arrow indicating the alignment treatment direction AD4 draws away from the fourth substrate SUB4.

The liquid crystal molecule LMB close to the third polarizer POL3 and the third substrate SUB3 is aligned such that the major axis thereof extends along the alignment treatment direction AD3. Alternatively, the liquid crystal molecule LMB is aligned in a direction along the third transmission axis T3. That is, the liquid crystal molecule LMB is aligned in the direction of 225°. In addition, the liquid crystal molecule LMB is inclined such that the end portion thereof close to the front end of the arrow indicating the alignment treatment direction AD3 draws away from the third substrate SUB3 (or the end portion thereof close to the rear end of the arrow indicating the alignment treatment direction AD3 draws toward the third substrate SUB3).

A liquid crystal molecule LMC at substantially the center (in a middle layer) in the third direction (thickness direction) Z of the liquid crystal layer LC1 is aligned such that the major axis thereof extends along the second direction Y. Alternatively, the liquid crystal molecule LMC of the middle layer is substantially orthogonal to the first direction X. The major axis of the liquid crystal molecule LMC is substantially parallel to the first transmission axis T1 of the first polarizer POL1 shown in FIG. 3.

Note that at least one of the arrow indicating the alignment treatment direction AD3 and the arrow indicating the alignment treatment direction AD4 may be opposite. In addition, the alignment treatment direction AD4 and the fourth transmission axis T4 may be located in the direction of 225°, and the alignment treatment direction AD3 and the third transmission axis T3 may be located in the direction of 135°. Furthermore, as long as the liquid crystal molecule LMC is aligned along the second direction Y, the liquid crystal molecules LM1 arranged in the third direction Z can be twist-aligned counterclockwise.

The configuration example described above is when the illumination light emitted from the illumination device IL is natural light. However, when the illumination light is linearly polarized light, the fourth polarizer POL4 may be omitted. In addition, a reflective polarization film which transmits specific linearly polarized light (for example, a P wave) of the illumination light which is natural light but reflects the other linearly polarized light (for example, an S wave) may be disposed. Furthermore, when the illumination light is linearly polarized light having a polarization axis in a different direction from the alignment treatment direction AD4, it is preferable that a ½ waveplate similar to the polarization axis rotation element 100 should be disposed in place of the fourth polarizer POL4. Furthermore, when the light transmitted through the viewing angle control panel 1 is linearly polarized light having a similar degree of polarization to the second polarization component, the third polarizer POL3 may be omitted.

During the off time when no drive voltage is applied to the liquid crystal layer LC1, the major axis of the liquid crystal molecule LMC of the middle layer of the liquid crystal molecules LM1 is substantially parallel to the second direction Y and is substantially parallel to the X-Y plane. When the fourth polarizer POL4 and the third polarizer POL3 are disposed in the crossed Nicols relationship, a maximum transmittance is obtained during the off time.

During the on time when a drive voltage is applied to the liquid crystal layer LC1, the alignment state of the liquid crystal molecules LM1 is different from the alignment state of the liquid crystal molecules LM1 during the off time. As the drive voltage applied to the liquid crystal layer LC1 increases, the transmittance decreases. It is assumed that a drive voltage applied to the liquid crystal layer LC1 when a minimum transmittance is obtained is a maximum voltage. When about ½ of the maximum voltage is applied to the liquid crystal layer LC1, the major axis of the liquid crystal molecule LMC is substantially parallel to the second direction Y and is inclined with respect to the X-Y plane.

The transmittance obtained in the viewing angle control panel 1 during the on time is different between when an observation position is inclined from the normal direction (the third direction Z) toward the front end of an arrow indicating the second direction Y and when the observation position is inclined from the normal direction toward the rear end of the arrow indicating the second direction Y.

This point will be described with reference to simulation results of a viewing angle characteristic. The conditions of the simulation described here are as follows. The illumination light from the illumination device IL is natural light, the viewing angle control panel 1 is located between the third polarizer POL3 and the fourth polarizer POL4, the first polarizer POL1, the second polarizer POL2 and the display panel PNL are not disposed, and the wavelength of the transmitted light is 550 nm.

The first mode corresponds to a state where the viewing angle control panel 1 is not driven or when a first drive voltage V1 applied to the liquid crystal layer LC1 is a minimum voltage. The second mode corresponds to a state where the viewing angle control panel 1 is driven by a minute drive voltage or when a second drive voltage V2 applied to the liquid crystal layer LC is greater than the first drive voltage V1. The third mode corresponds to a state where the viewing angle control panel 1 is driven by a medium drive voltage (a drive voltage of about ½ of the maximum voltage) or when a third drive voltage V3 applied to the liquid crystal layer LC1 is greater than the second drive voltage V2.

In each of the first to third modes, the viewing angle characteristic is simulated. In each of the first to third modes, the luminance level of the light-emitting element LE in the illumination device IL is equal.

Figure 5:
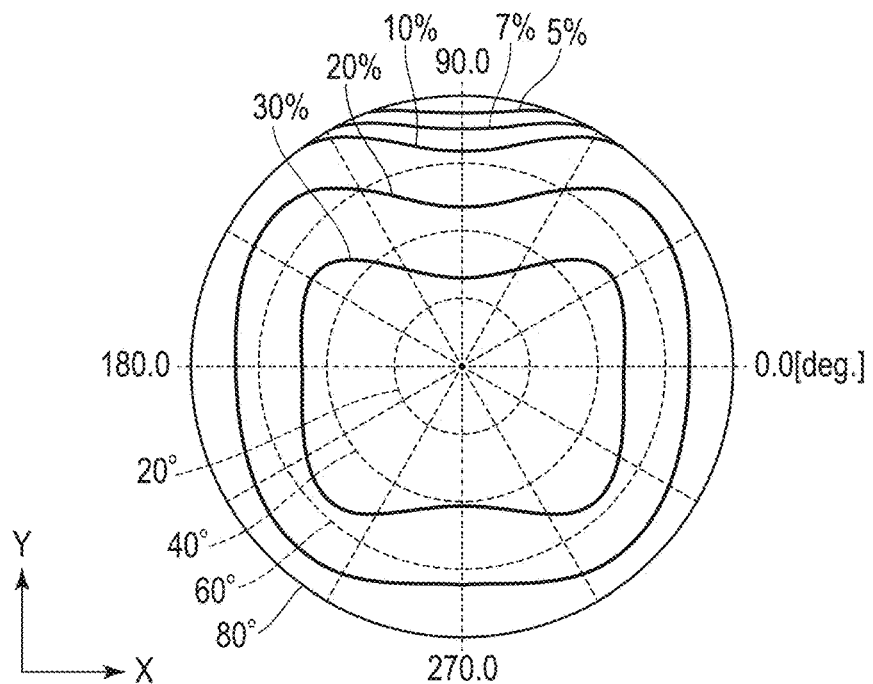
FIG. 5 is an illustration showing a simulation result of a viewing angle characteristic in the first mode.

FIG. 5 is an illustration showing the simulation result of the viewing angle characteristic in the first mode. For example, the first drive voltage V1 is 0 V.

A direction of 0° in the drawing corresponds to the front side of the arrow indicating the first direction X described above, a direction of 180° corresponds to the rear side of the arrow indicating the first direction X, a direction of 90° corresponds to the front end of the arrow indicating the second direction Y, and a direction of 270° corresponds to the rear end of the arrow indicating the second direction Y. In addition, the centers of concentric circles corresponds to the normal direction of the viewing angle control panel 1 (the third direction), and the concentric circles centered on the normal direction correspond to inclination angles of 20°, 40°, 60° and 80° with respect to the normal, respectively. The characteristic diagram illustrated here is obtained by connecting areas of an equal transmittance for the respective directions.

When the observation position is inclined in the direction of 0° and when the observation position is inclined in the direction of 180°, a substantially equal transmittance is obtained. A transmittance obtained when the observation position is inclined in the direction of 90° tends to be less than a transmittance obtained when the observation position is inclined in the direction of 270°. For example, when the inclination angle is 60°, the transmittance in the direction of 270° is 20 to 30%, but the transmittance in the direction of 90° is 10 to 20%.

Figure 6:
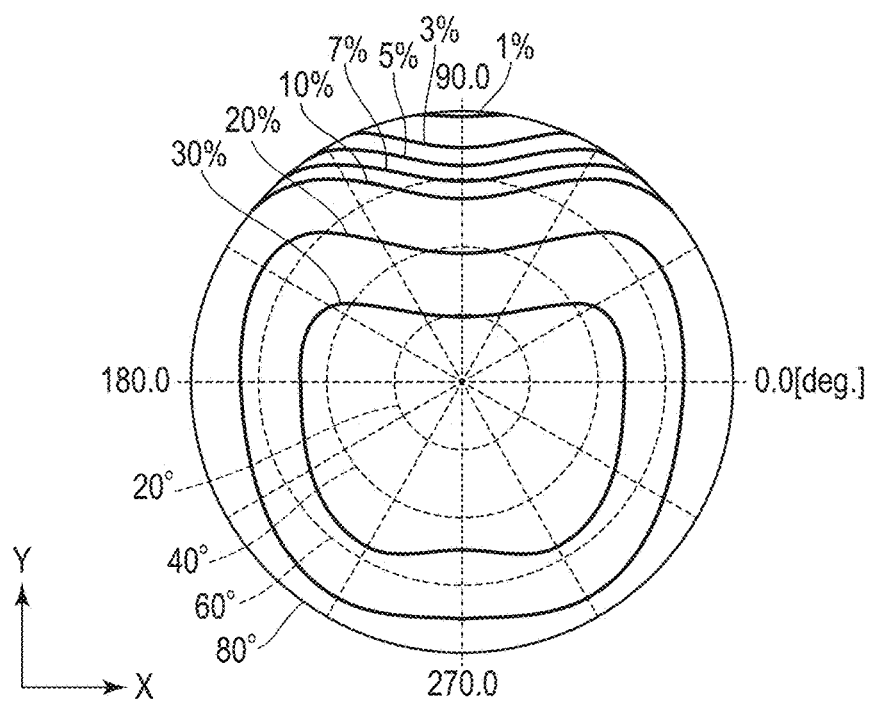
FIG. 6 is an illustration showing a simulation result of a viewing angle characteristic in the second mode.

FIG. 6 is an illustration showing the simulation result of the viewing angle characteristic in the second mode. For example, the second drive voltage V2 is 1.5 V.

When the observation position is inclined in the direction of 270°, a relatively high transmittance is obtained. On the other hand, when the observation position is inclined in the direction of 90°, the transmittance tends to decrease rapidly. For example, when the inclination angle is 60°, the transmittance in the direction of 270° is 20 to 30%, but the transmittance in the direction of 90° is 5 to 7%.

FIG. 7 is an illustration showing the simulation result of the viewing angle characteristic in the third mode. For example, the third drive voltage V3 is 2.0 V.

When the observation position is inclined in the direction of 270°, a relatively high transmittance is obtained. On the other hand, when the observation position is inclined in the direction of 90°, the transmittance tends to decrease more rapidly than the second mode. For example, when the inclination angle is 60°, the transmittance in the direction of 270° is about 30%, but the transmittance in the direction of 90° is about less than or equal to 1%.

In the present embodiment, the viewing angle of the display device DSP is controlled using the viewing angle control panel 1 having the above-described viewing angle characteristic. That is, according to the viewing angle control panel 1, since the liquid crystal molecule LMC of the middle layer of the liquid crystal molecules LM1 twist-aligned in the liquid crystal layer LC1 is aligned along the second direction Y, the transmittance distribution along the second direction Y becomes asymmetrical. The transmittance in the direction of 90° corresponding to the front end of the arrow indicating the second direction Y is less than the transmittance in the direction of 270° corresponding to the rear end of the arrow indicating the second direction Y. In particular, in the third mode, in a range where the inclination angle is greater than or equal to 60°, the transmittance in the direction of 90° becomes less than or equal to 1% (that is, a light-shielding state). Therefore, the display light of the display device DSP is hardly transmitted in the direction of 90°. That is, the display image of the display device DSP is hardly viewed in the direction of 90°.

FIG. 8 is an illustration showing the relationship between the drive voltage and the luminance of the transmitted light in the viewing angle control panel 1. The horizontal axis in the drawing shows the drive voltage, and the vertical axis in the drawing shows the luminance. The luminance here corresponds to the luminance of the transmitted light which is transmitted through the third polarizer POL3 when the viewing angle control panel 1 is located between the third polarizer POL3 and the fourth polarizer POL4 and reference light having a predetermined luminance is emitted from the fourth polarizer POL4 side.

A in the drawing indicates the luminance in the normal direction of the viewing angle control panel 1 (the third direction). B in the drawing indicates the luminance in the direction of 90° in the X-Y plane when the inclination angle with respect to the normal is 60°. The luminance level of the light-emitting element LE in the illumination device IL is constant regardless of the magnitude of the drive voltage in the viewing angle control panel 1.

In the luminance distribution A, the luminance is almost constant in a range from the first drive voltage V1 to the second drive voltage V2, and the luminance tends to gradually decrease as the drive voltage increases in a range exceeding the second drive voltage V2. In order to suppress the decrease of the luminance in the normal direction with the increase of the drive voltage, the luminance level of the light-emitting element LE may be increased with the increase of the drive voltage. Accordingly, as shown by C in the drawing, a rapid decrease of the luminance can be suppressed.

In the luminance distribution B, the luminance gradually decreases as the drive voltage increases in a range from the first drive voltage V1 to the third drive voltage V3, and a minimum luminance is obtained with the third drive voltage V3. In a range exceeding the third drive voltage V3, the luminance tends to gradually increase as the drive voltage increases.

Figure 9:
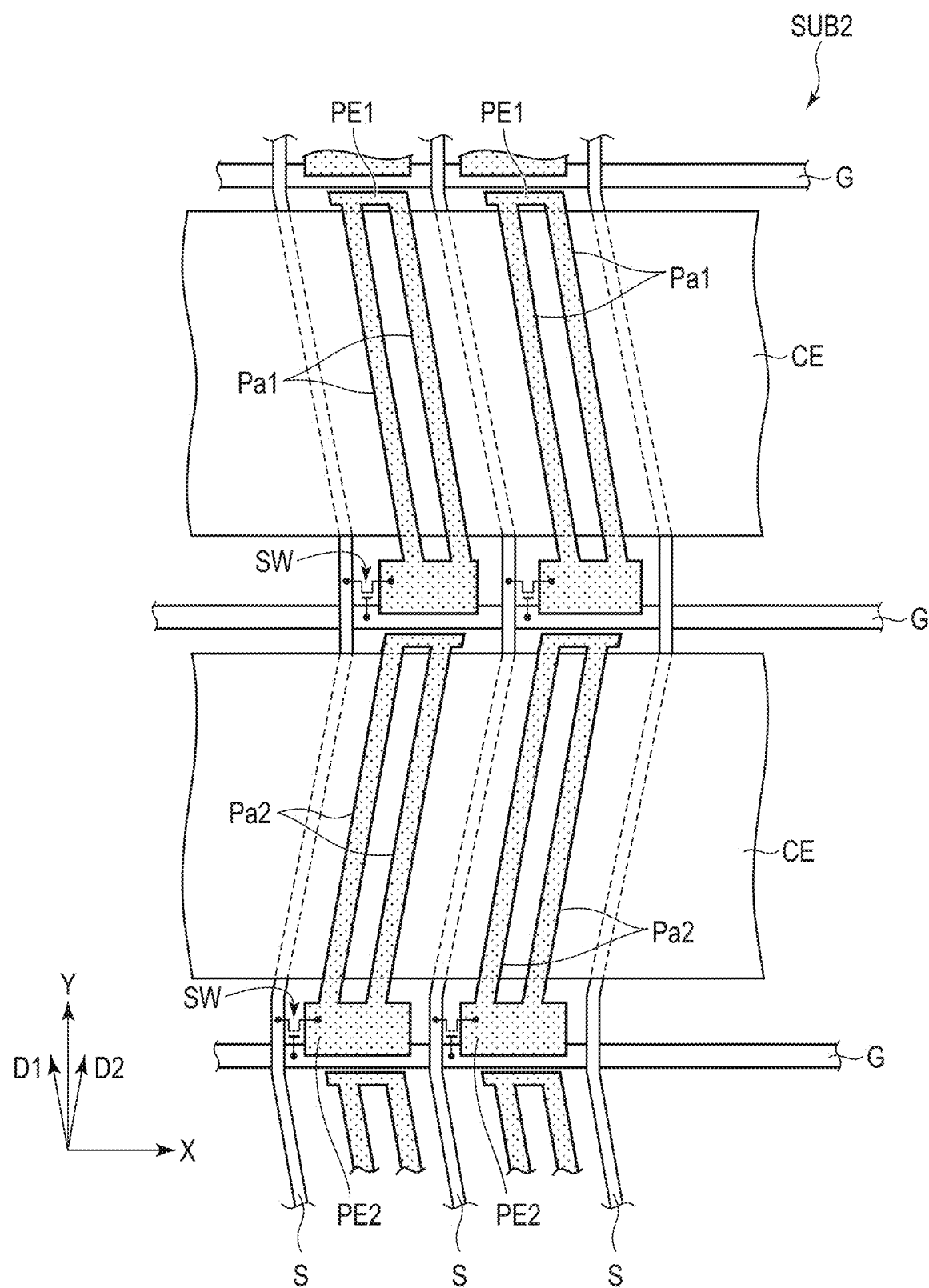
FIG. 9 is a plan view showing an example of a pixel layout in the display panel PNL.

FIG. 9 is a plan view showing an example of a pixel layout in the display panel PNL. Only constituent elements required for explanation are illustrated here. The second substrate SUB2 comprises a plurality of scanning lines G, a plurality of signal lines S, a plurality of switching elements SW, and pixel electrodes PE1 and PE2. The scanning lines G each extend linearly along the first direction X, and are arranged at intervals in the second direction Y. The signal lines S each extend substantially along the second direction Y, and are arranged at intervals in the first direction X. The switching elements SW each are electrically connected to one of the scanning lines G and one of the signal lines S. The pixel electrodes PE1 and PE2 each are electrically connected to one of the switching elements SW.

The pixel electrodes PE1 are arranged along the first direction X. The pixel electrodes PE1 each have strip electrodes Pa1 overlapping the common electrode CE. The strip electrodes Pa1 extend in a direction D1 different from the first direction X and the second direction Y.

The pixel electrodes PE2 are arranged along the first direction X. The pixel electrodes PE2 each have strip electrodes Pa2 overlapping the common electrode CE. The strip electrodes Pa2 extend along a direction D2 different from the direction D1. Note that the number of strip electrodes Pa1 and the number of strip electrodes Ps2 may be one or greater than or equal to three.

Figure 10:
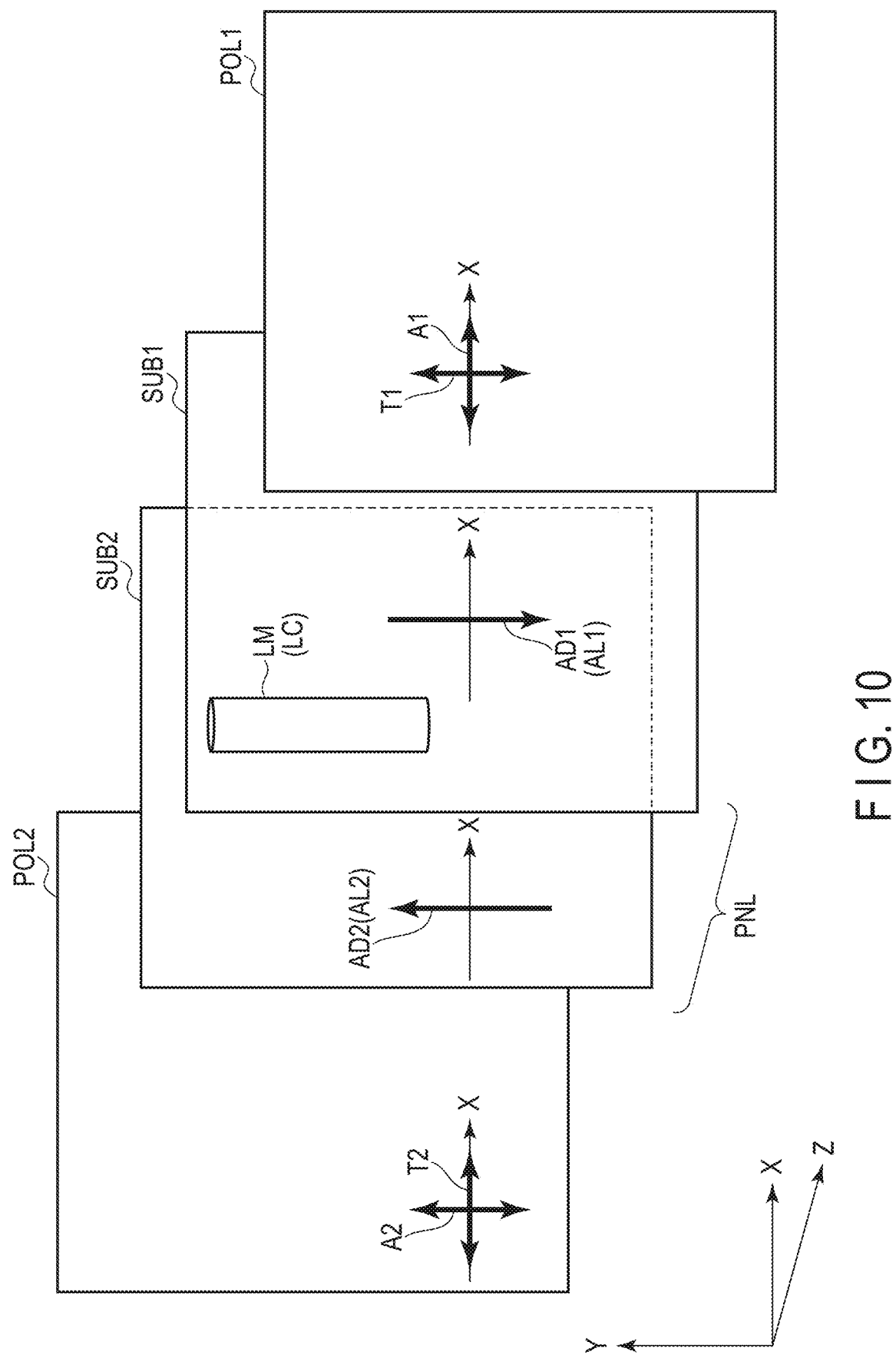
FIG. 10 is an illustration for explaining a configuration example of the display panel PNL.

FIG. 10 is an illustration for explaining a configuration example of the display panel PNL. The initial alignment state of the liquid crystal molecules LM during the off time when no voltage is applied to the liquid crystal layer LC between the alignment film AL1 and the alignment film AL2 is illustrated here.

An alignment treatment direction AD1 of the alignment film AL1 and an alignment treatment direction AD2 of the alignment film AL2 are substantially parallel to each other and are opposite to each other. The alignment treatment direction AD1 and the alignment treatment direction AD2 are, for example, substantially parallel to the first transmission axis T1. That is, in the X-Y plane, the front end of an arrow indicating the alignment treatment direction AD2 is located in the direction of 90°, and the front end of an arrow indicating the alignment treatment direction AD1 is located in the direction of 270°. In the liquid crystal layer LC, the liquid crystal molecules LM arranged along the third direction Z are aligned homogeneously. The liquid crystal molecules LM are aligned such that the major axes thereof extend along the second direction Y.

Note that, when the light transmitted through the polarization axis rotation element 100 is linearly polarized light having a similar degree of polarization to the first polarization component, the second polarizer POL2 may be omitted. In addition, the alignment treatment direction AD1 and the alignment treatment direction AD2 may be substantially orthogonal to the first transmission axis T1. Furthermore, the second transmission axis T2 may be located in the direction of 90° and the first transmission axis T1 may be located in the direction of 0°, but as described above, it is preferable, from the perspective of viewing a display image via polarized sunglasses, that the first transmission axis T1 should be located in the direction of 90° and the second transmission axis T2 should be located in the direction of 0° as shown in the drawing.

Figure 11:
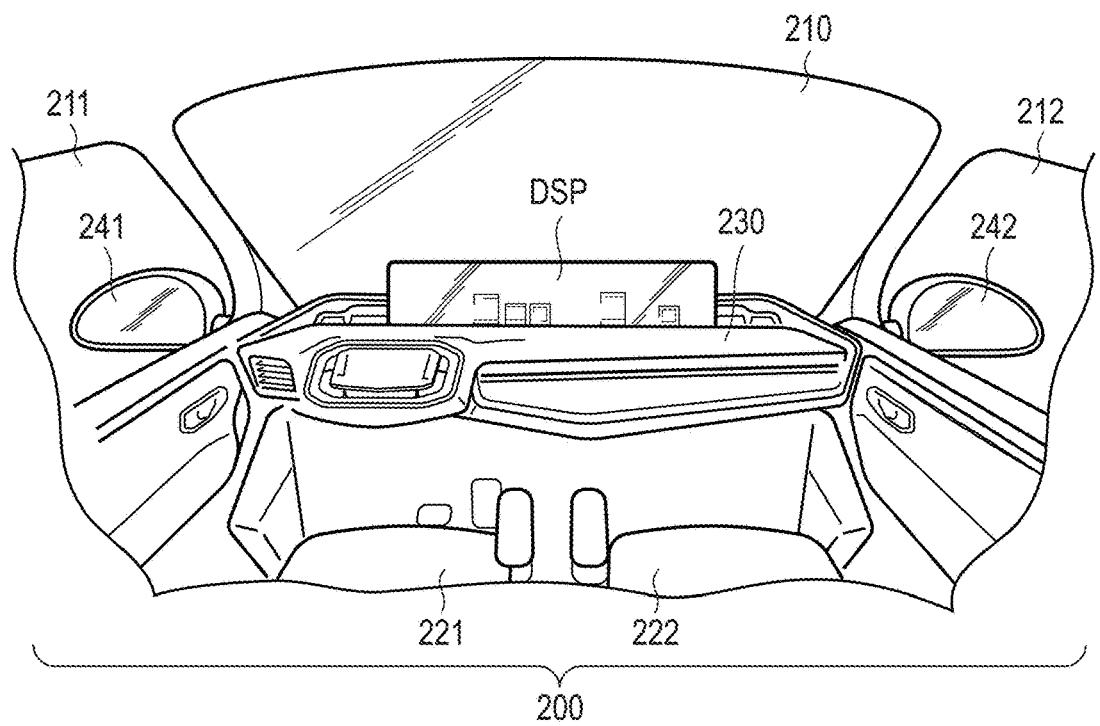
FIG. 11 is an illustration showing an application example of the display device DSP.

FIG. 11 is an illustration showing an application example of the display device DSP. The display device DSP shown in FIG. 11 corresponds to a vehicle display device mounted on a vehicle 200. The vehicle 200 comprises a front window 210 disposed in the front part of the vehicle 200, side windows 211 and 212 disposed respectively in the side parts of the vehicle 200, a driver seat 221 and a passenger seat 222, a dashboard 230 disposed in front of the driver seat 221 and the passenger 222, the display device DSP disposed in the dashboard 230, and side mirrors 241 and 242 disposed respectively in the side parts of the vehicle 200.

The display device DSP is located in front of the driver seat 221 and the passenger seat 222. It is assumed that the driver seat 221 and the passenger seat 222 are arranged in the first direction X described in the configuration example described above. When the display device DSP is composed employing the configuration example shown in FIG. 1, the direction of 0° shown in FIGS. 5 to 7 and the like correspond to the direction of the passenger seat, and the direction of 180° corresponds to the direction of the driver seat.

Figure 12:
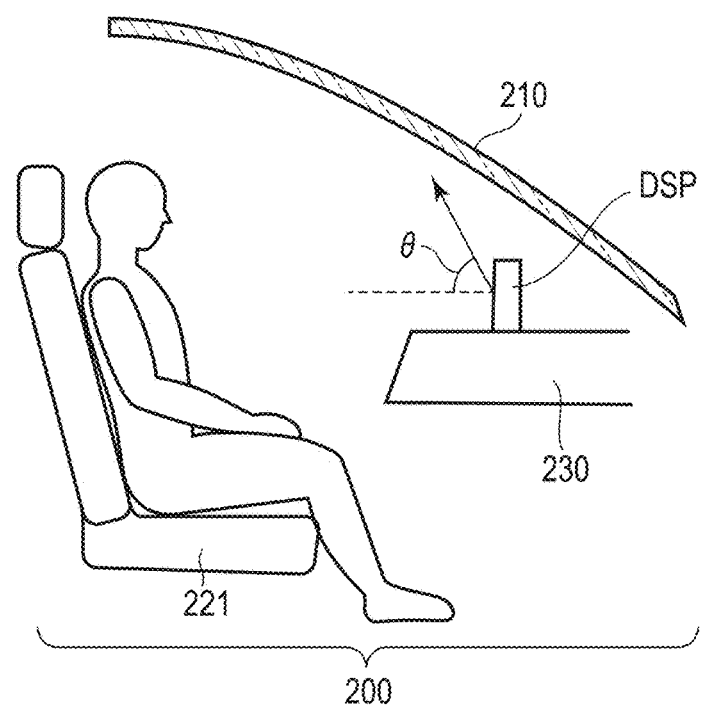
FIG. 12 is a side view of a driver seat side of a vehicle 200 shown in FIG. 11.

FIG. 12 is a side view of the driver seat side of the vehicle 200 shown in FIG. 11. The front window 210 is located above the display device DSP. In particular, in a range where an inclination angle θ with respect to the normal to the display device DSP is greater than or equal to 60°, the display device DSP and the front window 210 are close to each other. The direction of the front window 210 with respect to the display device DSP corresponds to the direction of 90° in the X-Y plane shown in FIG. 7 and the like.

The driver on the driver seat 221 (the user) observes the display device DSP almost from the front. At this time, the transmittance of the light transmitted through the viewing angle control panel 1 becomes a transmittance with an inclination angle of around 0° to 40° of the concentric circles shown in FIGS. 5 to 7, and a high transmittance is obtained in all of the first to third modes. That is, the driver can view an image displayed on the display device DSP.

In addition, as shown in FIGS. 5 to 7, the transmittance in the direction of the front window 210 becomes less than or equal to 7% in the second mode and becomes less than or equal to 1% in the third mode, and becomes almost a light-shielding state. Therefore, in the second mode or the third mode, an undesirable phenomenon (projection) where a display image displayed on the display device DSP is projected on the front window 210 can be suppressed.

Next, control examples of the display system SYS according to the first embodiment will be described.

Figure 13:
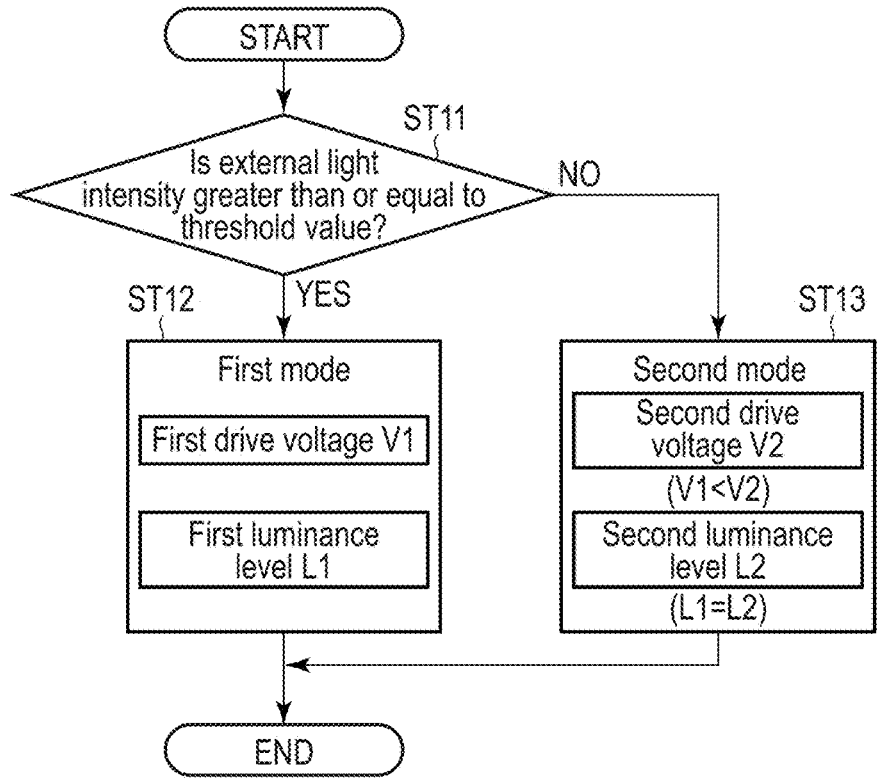
FIG. 13 is an illustration for explaining the first control example of the display system SYS.

FIG. 13 is an illustration for explaining the first control example of the display system SYS.

First, the main controller CT shown in FIG. 2 determines whether an external light intensity is greater than or equal to a predetermined threshold value or not based on a signal output from the external light sensor AS (step ST11). When the external light intensity is greater than or equal to the predetermined threshold value corresponds to, for example, when the external light intensity is detected in the daytime. When the external light intensity is less than the predetermined threshold value corresponds to, for example, when the external light intensity is detected in the twilight or in the night.

When determining that the external light intensity is greater than or equal to the threshold value (YES in step ST11), the main controller CT controls the viewing angle controller VCT and the illumination controller ICT to execute the first mode (step ST12). At this time, the viewing angle controller VCT sets the level of a drive voltage to be applied to the liquid crystal layer LC1 to the first drive voltage V1, and controls the potentials of the first transparent electrode TE1 and the second transparent electrode TE2. The first drive voltage V1 is, for example, 0 V. In addition, the illumination controller ICT sets the luminance level of the light-emitting element LE to a first luminance level L1, and controls a current supplied to the light-emitting element LE.

On the other hand, when determining that the external light intensity is less than the threshold value (NO in step ST11), the main controller CT controls the viewing angle controller VCT and the illumination controller ICT to execute the second mode (step ST13). At this time, the viewing angle controller VCT sets the level of the drive voltage to be applied to the liquid crystal layer LC1 to the second drive voltage V2, and controls the potentials of the first transparent electrode TE1 and the second transparent electrode TE2. The second drive voltage V2 is greater than the first drive voltage V1 (V1<V2). For example, the second drive voltage V2 is greater than or equal to 1.5 V but less than or equal to 2.5 V.

In addition, the illumination controller ICT sets the luminance level of the light-emitting element LE to a second luminance level L2, and controls the current supplied to the light-emitting element LE. The second luminance level L2 in the first control example is equal to the first luminance level L1 (L1=L2).

According to the first control example, in the twilight or in the night in which the external light intensity is less than the threshold value, the reflection of a display image displayed on the display device DSP in the front window 210 can be suppressed.

In addition, as described with reference to FIG. 8, the luminance in the normal direction of the display device DSP is also reduced by, for example, applying the second drive voltage of greater than or equal to 1.5 V but less than or equal to 2.5 V to the liquid crystal layer LC1. Accordingly, the display device DSP easy on the eyes of the user can be provided.

Figure 14:
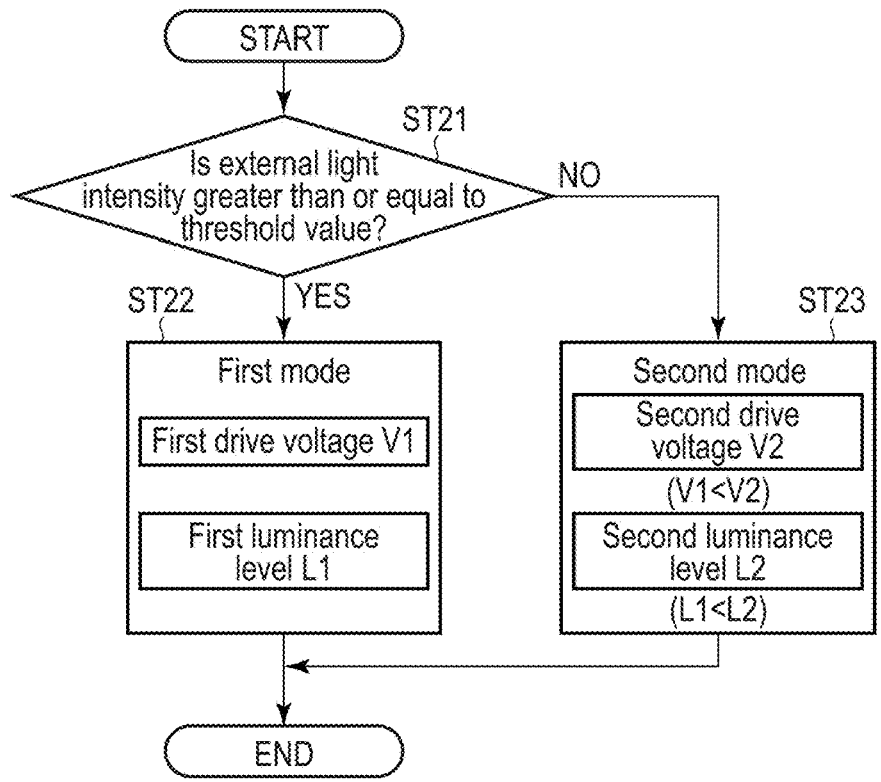
FIG. 14 is an illustration for explaining the second control example of the display system SYS.

FIG. 14 is an illustration for explaining the second control example of the display system SYS. The second control example illustrated here is different from the first control example described above in that the first luminance level L1 in the first mode and the second luminance level L2 in the second mode are different from each other.

That is, when it is determined by the main controller CT that the external light intensity is greater than or equal to the threshold value (YES in step ST21), in the first mode to be executed, the viewing angle controller VCT sets the level of the drive voltage to be applied to the liquid crystal layer LC1 to the first drive voltage V1, and the illumination controller ICT sets the luminance level of the light-emitting element LE to the first luminance level L1 (step ST22). The first luminance level L1 at this time is less than a maximum luminance level with which light can be emitted by the light-emitting element LE.

On the other hand, when it is determined by the main controller CT that the external light intensity is less than the threshold value (NO in step ST21), in the second mode to be executed, the viewing angle controller VCT sets the level of the drive voltage to be applied to the liquid crystal layer LC1 to the second drive voltage V2 (V1<V2), and the illumination controller ICT sets the luminance level of the light-emitting element LE to the second luminance level L2 (step ST23). The second luminance level L2 at this time is greater than the first luminance level L1 (L1<L2).

Also in the second control example, the reflection of the display image in the front window 210 can be suppressed similarly to the first control example described above.

In addition, as described with reference to FIG. 8, in the twilight or in the night in which the external light intensity is less than the threshold value, a rapid change of the luminance in the normal direction of the display device DSP can be suppressed by increasing the luminance level of the light-emitting element LE with the increase of the drive voltage applied to the liquid crystal layer LC1.

FIG. 15 is an illustration for explaining the third control example of the display system SYS.

The main controller CT determines whether the external light intensity is greater than or equal to the first threshold value or not based on the signal output from the external light sensor AS (step ST31). When determining that the external light intensity is less than the first threshold value (NO in step ST31), the main controller CT determines whether the external light intensity is greater than or equal to the second threshold value or not (step ST32).

When the external light intensity is greater than or equal to the first threshold value corresponds to, for example, when the external light intensity is detected in the daytime. When the external light intensity is greater than or equal to the second threshold value but less than the first threshold value corresponds to, for example, when the external light intensity is detected in the twilight. When the external light intensity is less than the second threshold value corresponds to, for example, when the external light intensity is detected in the night.

When determining that the external light intensity is greater than or equal to the first threshold value (YES in step ST31), the main controller CT controls the viewing angle controller VCT and the illumination controller ICT to execute the first mode (step ST33). At this time, the viewing angle controller VCT sets the level of the drive voltage to be applied to the liquid crystal layer LC1 to the first drive voltage V1, and the illumination controller ICT sets the luminance level of the light-emitting element LE to the first luminance level L1.

When determining that the external light intensity is less than the first threshold value (NO in step ST31) and is greater than or equal to the second threshold value (YES in step ST32), the main controller CT controls the viewing angle controller VCT and the illumination controller ICT to execute the second mode (step ST34). At this time, the viewing angle controller VCT sets the level of the drive voltage to be applied to the liquid crystal layer LC1 to the second drive voltage V2, and the illumination controller ICT sets the luminance level of the light-emitting element LE to the second luminance level L2. The second drive voltage V2 is greater than the first drive voltage V1 (V1<V2).

When determining that the external light intensity is less than the second threshold value (NO in step ST32), the main controller CT controls the viewing angle controller VCT and the illumination controller ICT to execute the third mode (step ST35). At this time, the viewing angle controller VCT sets the level of the drive voltage to be applied to the liquid crystal layer LC1 to the third drive voltage V3, and the illumination controller ICT sets the luminance level of the light-emitting element LE to a third luminance level L3. The third drive voltage V3 is greater than the second drive voltage (V2<V3).

As for the first luminance level L1, the second luminance level L2 and the third luminance level L3, they may be equal to one another (L1=L2=L3) as in the first control example described above or may be different from one another (L1<L2<L3) as in the second control example as described above.

According to the third control example, the luminance in the direction of 90° of the display device DSP changes according to the external light intensity, and as the surrounding of the display device DSP becomes darker, the luminance in the direction of 90° decreases. In the twilight in which the external light intensity is less than the first threshold value and is greater than or equal to the second threshold value, and in the night in which the external light intensity is less than the second threshold value, it is possible to suppress the decrease of the visibility of the display image displayed on the display device DSP at the observation position of the user opposed to the display device DSP while suppressing the reflection of the display image in the front window 210.

Second Embodiment

Figure 16:
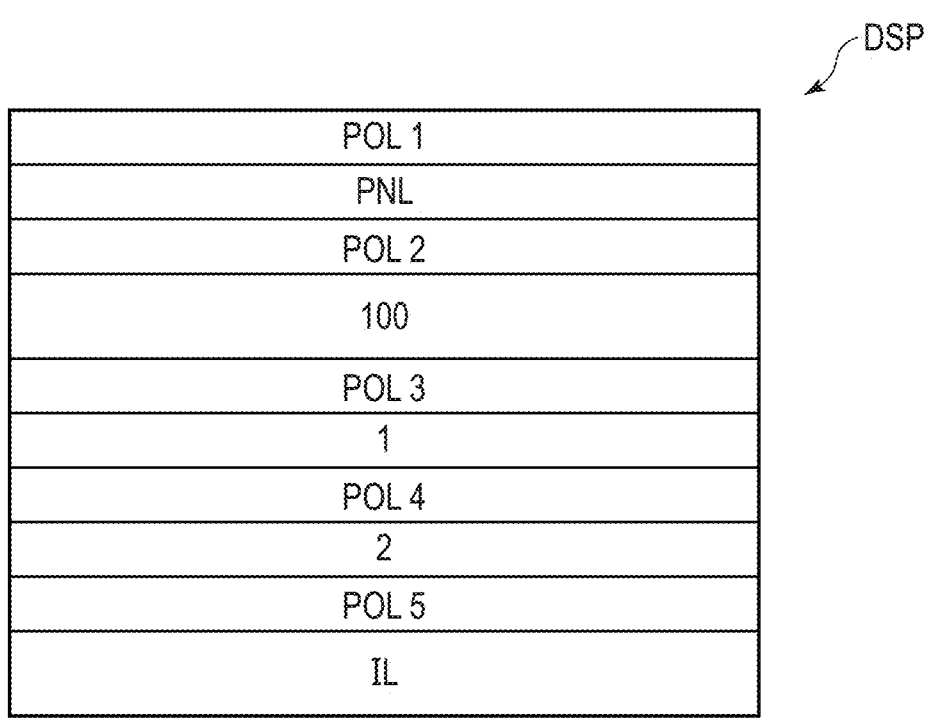
FIG. 16 is an illustration showing another configuration example of the display device DSP.

FIG. 16 is an illustration showing another configuration example of the display device DSP.

The display device DSP shown in FIG. 16 is different from the display device DSP shown in FIG. 1 in comprising a viewing angle control panel 2 and a fifth polarizer POL5 between the illumination device IL and the fourth polarizer POL4. That is, the display device DSP comprises the illumination device IL, the viewing angle control panels 1 and 2, the polarization axis rotation element 100, the display panel PNL and the first to fifth polarizers POL1 to POL5. The viewing angle control panel 2 is disposed between the fourth polarizer POL4 and the fifth polarizer POL5. The viewing angle control panels 1 and 2 each are, for example, a twisted nematic liquid crystal element.

Figure 17:
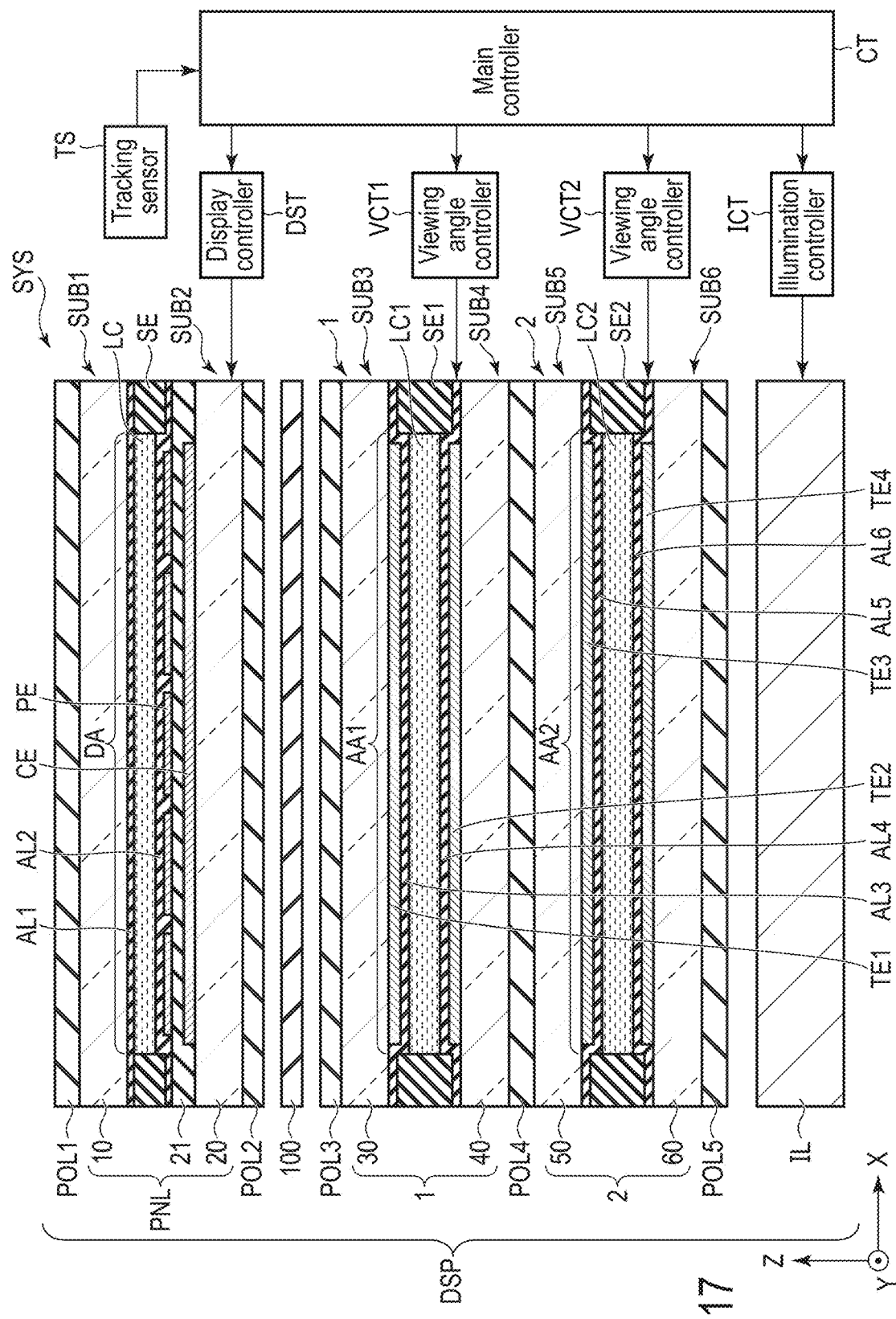
FIG. 17 is an illustration showing another configuration example of the display system SYS employing the display device DSP shown in FIG. 16.

FIG. 17 is an illustration showing another configuration example of the display system SYS employing the display device DSP shown in FIG. 16. The display system SYS shown in FIG. 17 is different from the display system SYS shown in FIG. 2 in comprising a tracking sensor TS in place of the external light sensor. That is, the display system SYS in the second embodiment comprises the display device DSP shown in FIG. 16, the main controller CT, the tracking sensor TS, the display controller DCT, the viewing angle controllers VCT1 and VCT2 and the illumination controller ICT.

The tracking sensor TS is configured to track the eye gaze of the user opposed to the display panel PNL. The main controller CT can control the viewing angle controllers VCT1 and VCT2 and the illumination controller ICT based on the eye gaze detected by the tracking sensor TS. A specific control example will be described later.

The display panel PNL, the viewing angle control panel 1 and the illumination device IL are composed as described above with reference to FIG. 2. The display controller DCT controls the drive voltage applied to the liquid crystal layer LC. The viewing angle controller VCT1 is controlled by the main controller CT, and is configured to control the level of the drive voltage to be applied to the liquid crystal layer LC1 based on the eye gaze detected by the tracking sensor TS. In addition, the illumination controller ICT is controlled by the main controller CT, and may be configured to control the luminance level of the light-emitting element LE based on the eye gaze detected by the tracking sensor TS.

The viewing angle control panel 2 is a liquid crystal panel similar to the viewing angle control panel 1, and comprises a fifth substrate SUB5, a sixth substrate SUB6 and a liquid crystal layer LC2. The liquid crystal layer LC2 is held between the fifth substrate SUB5 and the sixth substrate SUB6, and is sealed in by a sealant SE2. As will be described later, the liquid crystal layer LC2 contains liquid crystal molecules twist-aligned and has an optical rotary power which rotates the polarization axis of a polarization component which is linearly polarized light.

The fifth substrate SUB5 is located on the front side of the sixth substrate SUB6. The fifth substrate SUB5 comprises an insulating substrate 50, a third transparent electrode TE3 and an alignment film AL5. The sixth substrate SUB6 comprises an insulating substrate 60, a fourth transparent electrode TE4 and an alignment film AL6. In an effective area AA2 for controlling a viewing angle, the third transparent electrode TE3 and the fourth transparent electrode TE4 are formed over substantially the entire area.

The third transparent electrode TE3 and the fourth transparent electrode TE4 overlap each other via the liquid crystal layer LC2, and are controlled such that a predetermined drive voltage is applied to the liquid crystal layer LC2. The third transparent electrode TE3 and the fourth transparent electrode TE4 each are, for example, a single sheet-shaped electrode, but each may be divided into a plurality of electrodes along at least one of the first direction X and the second direction Y.

The viewing angle controller VCT2 controls the potential of the third transparent electrode TE3, the potential of the fourth transparent electrode TE4 and the like, and controls a drive voltage to be applied to the liquid crystal layer LC2. In the configuration example shown in FIG. 17, the viewing angle controller VCT2 is controlled by the main controller CT, and is configured to control the drive voltage based on the eye gaze detected by the tracking sensor TS.

Figure 18:
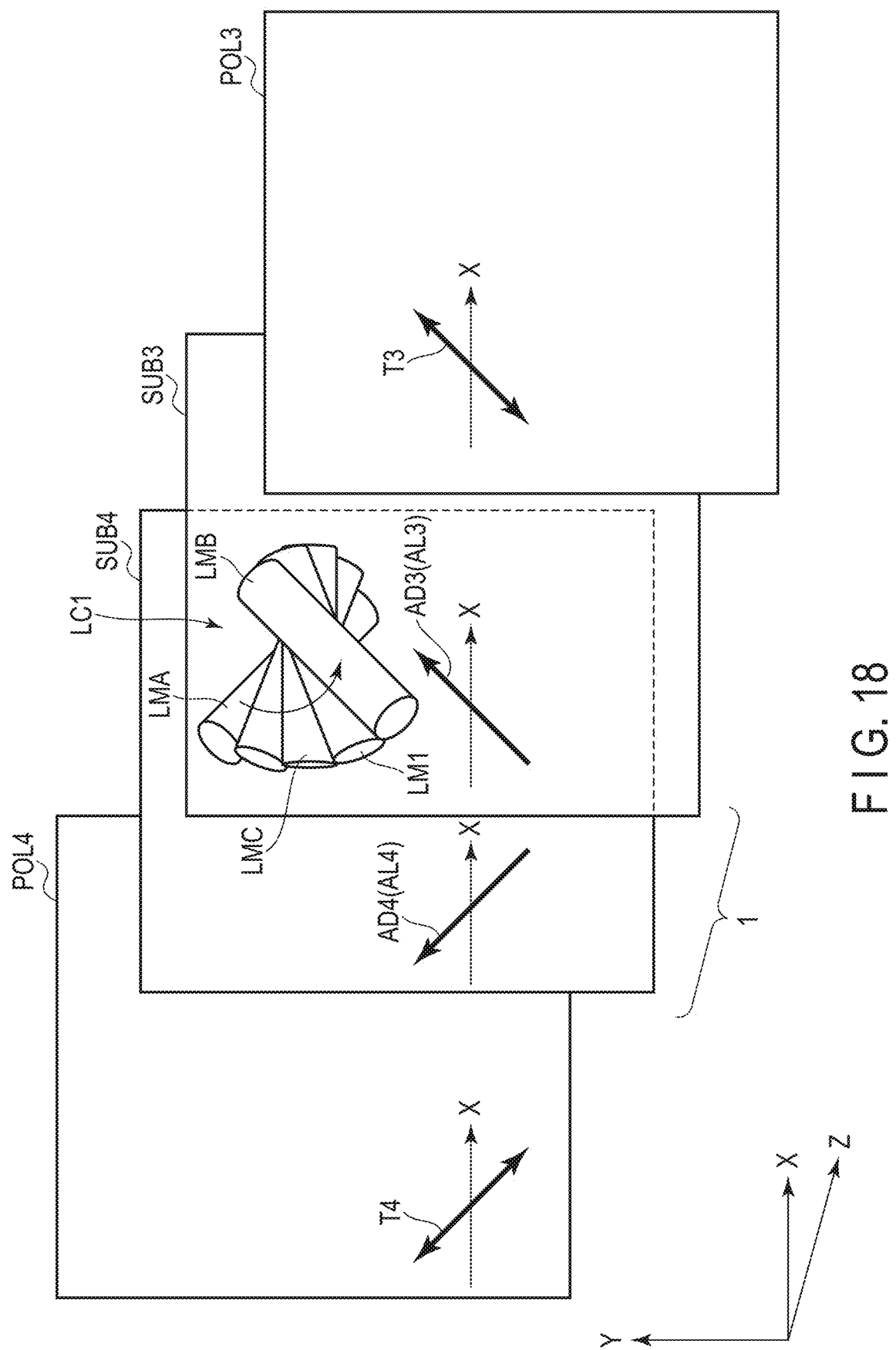
FIG. 18 is an illustration for explaining a configuration example of the viewing angle control panel 1 shown in FIG. 17.

FIG. 18 is an illustration for explaining a configuration example of the viewing angle control panel 1 shown in FIG. 17. The initial alignment state of the liquid crystal molecules LM1 during the off time when no voltage is applied to the liquid crystal layer LC1 between the alignment film AL3 and the alignment film AL4 is illustrated here.

The front end of an arrow indicating the alignment treatment direction AD4 is located in the direction of 135°, and the front end of an arrow indicating the alignment treatment direction AD3 is located in the direction of 45°. A chiral agent is added to the liquid crystal layer LC1, and the liquid crystal molecules LM1 arranged along the third direction Z are configured to be twist-aligned counterclockwise from the fourth polarizer POL4 (or the fourth substrate SUB4) toward the third polarizer POL3 (or the third substrate SUB3).

The liquid crystal molecule LMA close to the fourth polarizer POL4 and the fourth substrate SUB4 is aligned in the direction of 135°. The liquid crystal molecule LMB close to the third polarizer POL3 and the third substrate SUB3 is aligned in the direction of 45°. The liquid crystal molecule LMC of the middle layer of the liquid crystal layer LC1 is aligned such that the major axis thereof extends along the first direction X. The major axis of the liquid crystal molecule LMC is substantially parallel to the first absorption axis A1 of the first polarizer POL1 shown in FIG. 3.

Note that at least one of the arrow indicating the alignment treatment direction AD3 and the arrow indicating the alignment treatment direction AD4 may be opposite. In addition, the alignment treatment direction AD4 may be located in the direction of 45°, and the alignment treatment direction AD3 and the third transmission axis T3 may be located in the direction of 135°. Furthermore, as long as the liquid crystal molecule LMC is aligned along the first direction X, the liquid crystal molecules LM1 arranged in the third direction Z can be twist-aligned clockwise.

During the on time when the drive voltage is applied to the liquid crystal layer LC1 of the viewing angle control panel 1, the major axis of the liquid crystal molecule LMC is substantially parallel to the first direction X, and is inclined with respect to the X-Y plane. Therefore, a transmittance obtained when an observation position is inclined from the normal direction toward the rear end of an arrow indicating the first direction X (the left side of the drawing) is less than a transmittance obtained when the observation position is inclined from the normal direction (the third direction Z) toward the front end of the arrow indicating the first direction X (the right side of the drawing).

When the display device DSP comprising this viewing angle control panel 1 is mounted on the vehicle 200 shown in FIG. 11, in the second mode in which a drive voltage is applied to the liquid crystal layer LC1, a phenomenon where a display image displayed on the display device DSP is reflected in the side window 211 on the left side of the vehicle 200 can be suppressed.

Figure 19:
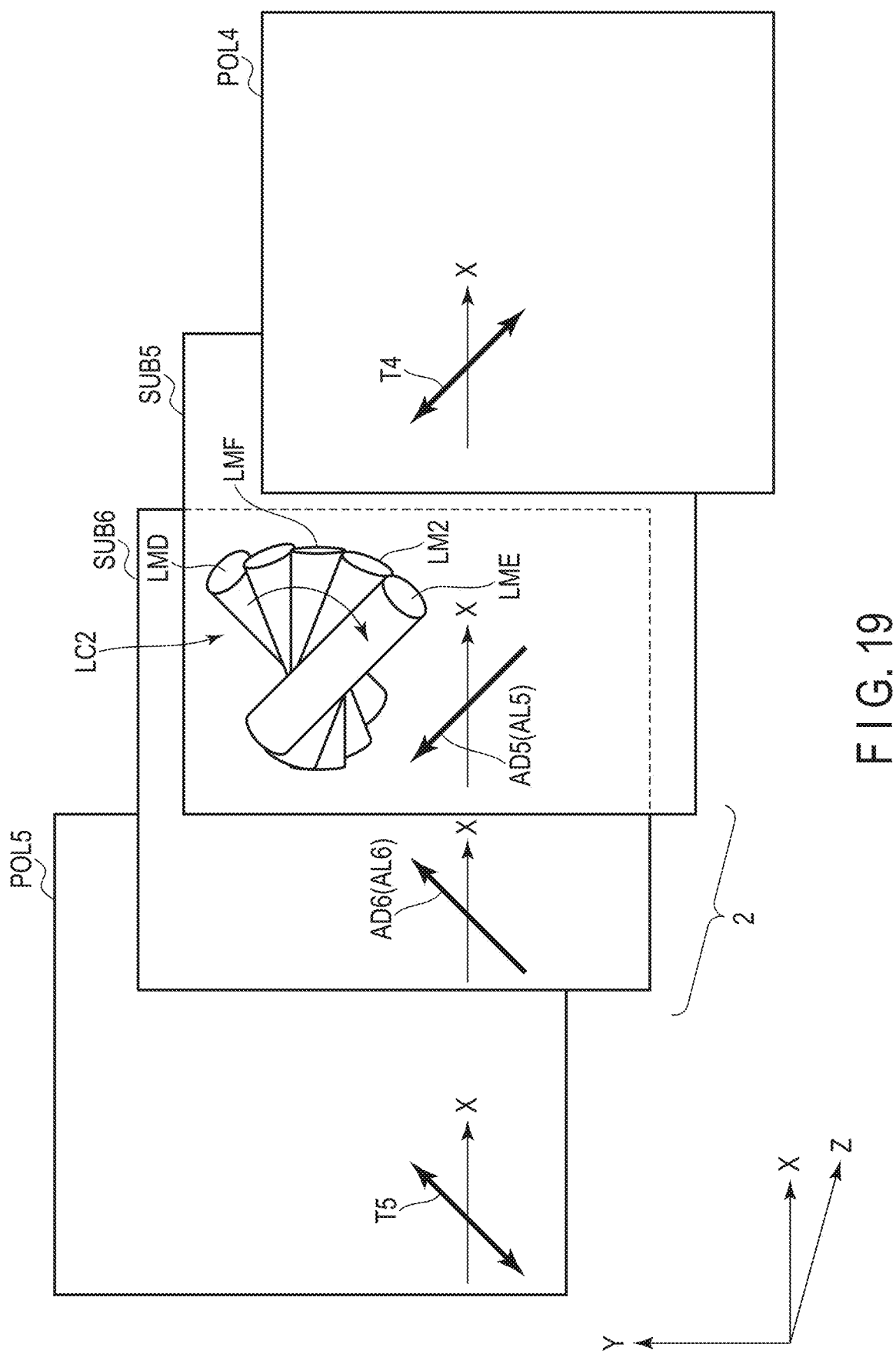
FIG. 19 is an illustration for explaining a configuration example of a viewing angle control panel 2 shown in FIG. 17.

FIG. 19 is an illustration for explaining a configuration example of the viewing angle control panel 2 shown in FIG. 17. The initial alignment state of liquid crystal molecules LM2 during an off time where no voltage is applied to the liquid crystal layer LC2 between the alignment film AL5 and the alignment film AL6 is illustrated here. The fourth transmission axis T4 of the fourth polarizer POL4 and a fifth transmission axis T5 of the fifth polarizer POL5 are orthogonal to each other. The fifth transmission axis T5 is located in the direction of 45°.

The front end of an arrow indicating an alignment treatment direction AD6 is located in the direction of 45°, and the front end of an arrow indicating an alignment treatment direction AD5 is located in the direction of 135°. A chiral agent is added to the liquid crystal layer LC2, and the liquid crystal molecules LM2 arranged along the third direction Z are configured to be twist-aligned clockwise from the fifth polarizer POL5 (or the sixth substrate SUB6) toward the fourth polarizer POL4 (or the fifth substrate SUB5).

A liquid crystal molecule LMD close to the fifth polarizer POL5 and the sixth substrate SUB6 is aligned in the direction of 45°. A liquid crystal molecule LME close to the fourth polarizer POL4 and the fifth substrate SUB5 is aligned in the direction of 135°. A liquid crystal molecule LMF of a middle layer of the liquid crystal layer LC2 is aligned such that the major axis thereof extends along the first direction X.

Note that at least one of the arrow indicating the alignment treatment direction AD5 and the arrow indicating the alignment treatment direction AD6 may be opposite. In addition, the alignment treatment direction AD6 and the fifth transmission axis T5 may be located in the direction of 135°, and the alignment treatment direction AD5 and the fourth transmission axis T4 may be located in the direction of 45°. Furthermore, as long as the liquid crystal molecule LMF is aligned along the first direction X, the liquid crystal molecules LM2 arranged in the third direction Z can be twist-aligned counterclockwise.

During an on time when a drive voltage is applied to the liquid crystal layer LC2 of the viewing angle control panel 2, the major axis of the liquid crystal molecule LMF is substantially parallel to the first direction X, and is inclined with respect to the X-Y plane. Therefore, a transmittance obtained when an observation position is inclined from the normal direction (the third direction Z) toward the front end of an arrow indicating the first direction X (the right side of the drawing) is less than a transmittance obtained when the observation position is inclined from the normal direction to the rear end of the arrow indicating the first direction X (the left side of the drawing).

When the display device DSP comprising this viewing angle control panel 2 is mounted on the vehicle 200 shown in FIG. 11, in the second mode in which a drive voltage is applied to the liquid crystal layer LC2, a phenomenon where a display image displayed on the display device DSP is reflected in the side window 212 on the right side of the vehicle 200 can be suppressed.

Next, a control example of the display system SYS will be described.

Figure 20:
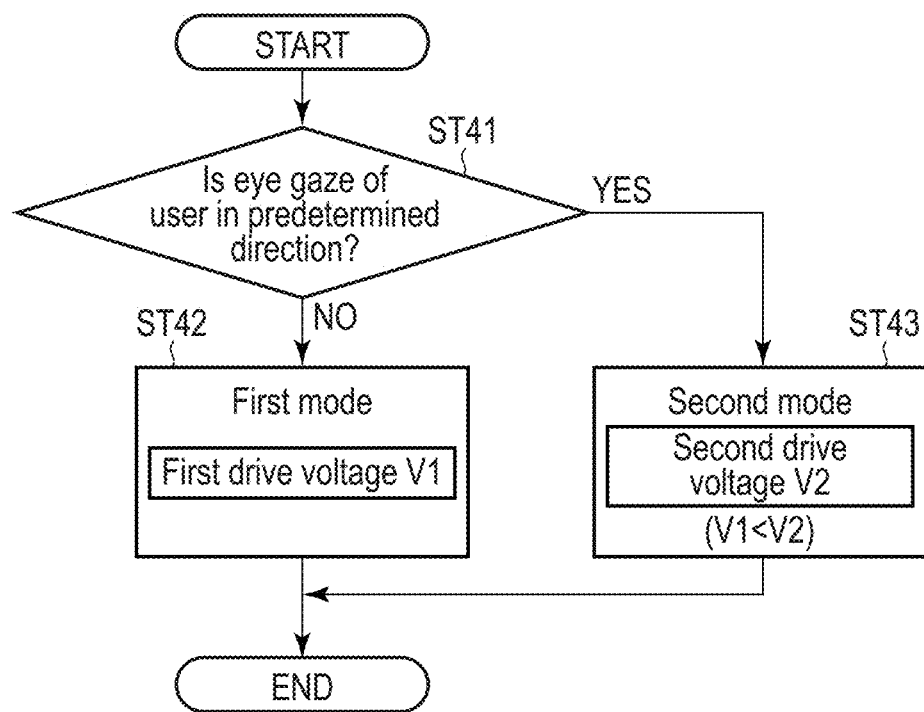
FIG. 20 is an illustration for explaining the fourth control example of the display system SYS.

FIG. 20 is an illustration for explaining the fourth control example of the display system SYS.

First, the controller CT shown in FIG. 17 determined whether the eye gaze of the user is in a predetermined direction or not based on a signal output from the tracking sensor TS (step ST41). When the eye gaze is in the predetermined direction corresponds to, for example, when the driver of the vehicle 200 views the side mirror 241 via the side window 211 or when the driver views the side mirror 242 via the side window 212.

When determining that the eye gaze is not in the predetermined direction, that is, the eye gaze is in a direction different from the predetermined direction (NO in step ST41), the main controller CT controls the viewing angle controllers VCT1 and VCT2 and the illumination controller ICT to execute the first mode (step ST42).

At this time, the viewing angle controller VCT1 sets the level of the drive voltage to be applied to the liquid crystal layer LC1 to the first drive voltage V1, and controls the potentials of the first transparent electrode TE1 and the second transparent electrode TE2. Similarly, the viewing angle controller VCT2 sets the level of the drive voltage to be applied to the liquid crystal layer LC2 to the first drive voltage V1, and controls the potentials of the third transparent electrode TE3 and the fourth transparent electrode TE4. The first drive voltage V1 is, for example, 0 V. That is, when the eye gaze is in a direction different from the predetermined direction, the viewing angle control by the viewing angle control panels 1 and 2 is not performed.

On the other hand, when determining that the eye gaze is in the predetermined direction (YES in step ST41), the main controller CT controls the viewing angle controllers VCT1 and VCT2 and the illumination controller ICT to execute the second mode (step ST43).

In the second mode, for example, when it is determined that the eye gaze is directed to the left side of the vehicle 200, the viewing angle controller VCT1 sets the level of the drive voltage to be applied to the liquid crystal layer LC1 to the second drive voltage V2, and controls the potentials of the first transparent electrode TE1 and the second transparent electrode TE2. The second drive voltage V2 is greater than the first drive voltage V1 (V1<V2). It is possible, by this control, to suppress a phenomenon where a display image displayed on the display device DSP is reflected in the side window 211 on the left side of the vehicle 200. Accordingly, the user can view the side mirror 241 via the side window 211. Note that the level of the drive voltage to be applied to the liquid crystal layer LC2 may be set to the first drive voltage V1 or the second drive voltage V2.

In addition, in the second mode, when it is determined that the eye gaze is direct to the right side of the vehicle 200, the viewing angle controller VCT2 sets the level of the drive voltage to be applied to the liquid crystal layer LC2 to the second drive voltage V2, and controls the potentials of the third transparent electrode TE3 and the fourth transparent electrode TE4. The second drive voltage V2 is greater than the first drive voltage V1 (V1<V2). It is possible, by this control, to suppress a phenomenon where a display image displayed on the display device DSP is reflected in the side window 212 on the right side of the vehicle 200. Accordingly, the user can view the side mirror 242 via the side window 212. Note that the level of the drive voltage to be applied to the liquid crystal layer LC1 may be set to the first drive voltage V1 or the second drive voltage V2.

The illumination controller ICT sets the luminance level of the light-emitting element LE to the first luminance level L1 in the first mode and sets the luminance level of the light-emitting element LE to the second luminance level L2 in the second mode, and controls the current supplied to the light-emitting element LE. The second luminance level L2 here may be equal to the first luminance level L1 or greater than the first luminance level L1.

According to the fourth control example, the luminance in the direction of 0° and the luminance in the direction of 180° of the display device DSP change according to the eye gaze of the user. Accordingly, the reflection of the display image displayed on the display device DSP in the side windows 211 and 212 can be suppressed, and the decrease of the visibility of the side mirrors 241 and 242 can be suppressed.

Note that the second embodiment described here may be combined with the first embodiment described above. Accordingly, in the twilight or in the night in which the external light intensity is less than the threshold value, the decrease of the visibility of the side mirrors 241 and 242 can be suppressed.

In addition, a plurality of viewing angle control panels each configured to limit a transmittance in a specific direction in the X-Y plane may be combined together. The viewing angle control panels are different from each other in the retardation of the liquid crystal layer or the drive voltage of the liquid crystal layer. When the drive voltages of the viewing angle control panels are different from one another, the angle range of a viewing angle where viewing can be limited can be expanded as compared with the above-described configuration example. In addition, when the retardations (Δn·d) in the respective liquid crystal layers of the viewing angle control panels are different from one another, a luminance change amount can be adjusted between the observation from the front and the observation in the oblique direction. Accordingly, the control capability of a viewing angle in a specific direction can be improved.

As described above, according to the present embodiment, a display system capable of controlling a viewing angle, and a vehicle equipped with the display system can be provided. It is possible to perform viewing angle control by applying the display device to another portable electronic device such as a portable telephone or an electronic device such as a notebook computer or an amusement device. In addition, it is possible to perform viewing angle control for each area by dividing at least one of the transparent electrodes formed in the first viewing angle control panel or the second viewing angle control panel and changing voltage applied to each electrode. Note that the transparent electrode to be divided may be both of the transparent electrodes of the first viewing angle control panel and the second viewing angle control panel. In addition, the transparent electrode itself may not be disposed in an area in which viewing angle control is not required.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display system comprising:
an optical light sensor detecting a light intensity;
a display panel;
a first polarizer disposed on a front side of the display panel;
a viewing angle control panel comprising a liquid crystal layer containing liquid crystal molecules twist-aligned; and
a polarization axis rotation element disposed between the viewing angle control panel and the display panel, and rotating a polarization axis of light transmitted through the viewing angle control panel, wherein
the liquid crystal molecules twist-aligned include an alignment direction which is substantially parallel to a first transmission axis of the first polarizer,
the viewing angle control panel is configured that a luminance of a transmitted light in the alignment direction decreases as a drive voltage applied to the liquid crystal layer increases, and
the drive voltage when the light intensity is less than a threshold value is greater than the drive voltage when the light intensity is greater than or equal to the threshold value.

2. The display system of claim 1, further comprising an illumination device incorporating a light-emitting element, and configured to emit illumination light toward the display panel, wherein
a luminance level of the light-emitting element when the light intensity is greater than or equal to the threshold value is equal to the luminance level of the light-emitting element when the light intensity is less than the threshold value.

3. The display system of claim 1, further comprising an illumination device incorporating a light-emitting element, and configured to emit illumination light toward the display panel, wherein
a luminance level of the light-emitting element when the light intensity is less than the threshold value is greater than the luminance level of the light-emitting element when the light intensity is greater than or equal to the threshold value.

4. The display system of claim 1, further comprising:
a second polarizer disposed between the display panel and the polarization axis rotation element; and
a third polarizer disposed between the polarization axis rotation element and the viewing angle control panel, wherein
the second polarizer has a second transmission axis,
the third polarizer has a third transmission axis, and
the polarization axis rotation element is configured to impart a retardation of ½ wavelength to a transmitted light, and has an optical axis in a direction halfway between a direction of the second transmission axis and a direction of the third transmission axis.

5. A vehicle comprising:
a front window disposed in a front part of the vehicle;
a driver seat and a passenger seat;
a display device; and
an optical light sensor detecting a light intensity, wherein
the display device comprises:
a display panel;
a first polarizer disposed on a front side of the display panel; and
a viewing angle control panel comprising a liquid crystal layer containing liquid crystal molecules twist-aligned, and
the liquid crystal molecules twist-aligned include an alignment direction which is substantially parallel to a first transmission axis of the first polarizer,
the viewing angle control panel is configured that a luminance of a transmitted light in the alignment direction decreases as a drive voltage applied to the liquid crystal layer increases, and
the drive voltage when the light intensity is less than a threshold value is greater than the drive voltage when the light intensity is greater than or equal to the threshold value.

6. The vehicle of claim 5, wherein
the driver seat and the passenger seat are arranged in a first direction, and
the alignment direction is substantially orthogonal to the first direction.

7. The vehicle of claim 5, further comprising an illumination device incorporating a light-emitting element, and configured to emit illumination light toward the display panel, wherein
a luminance level of the light-emitting element when the light intensity is greater than or equal to the threshold value is equal to the luminance level of the light-emitting element when the light intensity is less than the threshold value.

8. The vehicle of claim 5, further comprising an illumination device incorporating a light-emitting element, and configured to emit illumination light toward the display panel, wherein
    a luminance level of the light-emitting element when the light intensity is less than the threshold value is greater than the luminance level of the light-emitting element when the light intensity is greater than or equal to the threshold value.

9. The vehicle of claim 5, further comprising a polarization axis rotation element disposed between the viewing angle control panel and the display panel, and configured to rotate a polarization axis of light transmitted through the viewing angle control panel.

10. The vehicle of claim 9, further comprising:
    a second polarizer disposed between the display panel and the polarization axis rotation element; and
    a third polarizer disposed between the polarization axis rotation element and the viewing angle control panel, wherein
    the second polarizer has a second transmission axis,
    the third polarizer has a third transmission axis, and
    the polarization axis rotation element is configured to impart a retardation of ½ wavelength to a transmitted light, and has an optical axis in a direction halfway between a direction of the second transmission axis and a direction of the third transmission axis.

\* \* \* \* \*